(12) United States Patent
Chau et al.

(10) Patent No.: US 10,110,524 B1
(45) Date of Patent: Oct. 23, 2018

(54) USER INTERFACE FOR ACTIVITY STATUS AND HISTORY

(71) Applicant: Google Inc., Mountain View, CA (US)

(72) Inventors: Stephen Chau, Palo Alto, CA (US); Andrew Timothy Szybalski, San Francisco, CA (US); Stephane Lafon, Sunnyvale, CA (US); Andrea Lynn Frome, Oakland, CA (US); Jerry Howard Morrison, Mountain View, CA (US); Derek King Prothro, San Mateo, CA (US); Huy Tuan Nguyen, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 14/927,404

(22) Filed: Oct. 29, 2015

Related U.S. Application Data

(63) Continuation of application No. 13/334,003, filed on Dec. 21, 2011, now Pat. No. 9,201,952.

(60) Provisional application No. 61/425,721, filed on Dec. 21, 2010.

(51) Int. Cl.
*G06F 17/30* (2006.01)
*H04L 12/58* (2006.01)
*G06F 3/0484* (2013.01)
*G06F 3/0482* (2013.01)

(52) U.S. Cl.
CPC .......... *H04L 51/046* (2013.01); *G06F 3/0482* (2013.01); *G06F 3/0484* (2013.01); *G06F 17/3053* (2013.01); *G06F 17/30554* (2013.01)

(58) Field of Classification Search
CPC ............. H04L 51/046; G06F 17/30554; G06F 17/3053; G06F 3/0484; G06F 3/0482; G06F 11/3438; G06F 17/30761; G06F 2201/86
USPC ............... 707/723, 732, 784, 722, 730, 748, 707/999.003
See application file for complete search history.

(56) References Cited

U.S. PATENT DOCUMENTS

| | | | |
|---|---|---|---|
| 7,197,502 B2 * | 3/2007 | Feinsmith | G06Q 10/10 |
| 8,244,848 B1 | 8/2012 | Narayanan et al. | |
| 8,442,849 B2 * | 5/2013 | Kantak | G06Q 30/02 705/7.11 |

(Continued)

*Primary Examiner* — Mohammed R Uddin
(74) *Attorney, Agent, or Firm* — McDermott Will & Emery LLP

(57) ABSTRACT

Some configurations of the subject technology provide a user interface including an activity-creation display configured to create a first activity of several activities, and a single-activity display configured to display a single activity of the several activities, and information related to a list of users associated with the activity. The single-activity display includes a parameter-entry display configured to select a parameter for the single activity and to send a signal to the single activity corresponding to the selected parameter, a heads-up display configured to send a heads-up message about the single activity to a user, a location display configured to display information related to a location of the single activity, a status indicator configured to display a status based on the status parameter of the single activity, and a status-entry display configured to, upon selection, send a signal to change the status indicator of the single activity.

18 Claims, 23 Drawing Sheets

(56) References Cited

U.S. PATENT DOCUMENTS

| | | | |
|---|---|---|---|
| 8,571,999 B2 * | 10/2013 | Crawford | H04L 67/24 705/319 |
| 9,201,952 B1 | 12/2015 | Chau et al. | |
| 9,235,848 B1 * | 1/2016 | Gourley | G06Q 30/0209 |
| 2005/0165893 A1 * | 7/2005 | Feinberg | G06F 11/302 709/205 |
| 2006/0042483 A1 | 3/2006 | Work | G06Q 10/00 101/91 |
| 2006/0167737 A1 | 7/2006 | Muller et al. | |
| 2007/0233736 A1 * | 10/2007 | Xiong | G06Q 30/02 |
| 2007/0300225 A1 | 12/2007 | Macbeth et al. | |
| 2008/0082565 A1 * | 4/2008 | Chang | G06Q 30/02 |
| 2008/0141144 A1 | 6/2008 | Muller et al. | |
| 2008/0319769 A1 | 12/2008 | Benchikha et al. | |
| 2009/0077000 A1 | 3/2009 | Begole et al. | |
| 2009/0119603 A1 * | 5/2009 | Stackpole | G06Q 10/109 715/753 |
| 2009/0187467 A1 | 7/2009 | Fang et al. | |
| 2009/0216569 A1 | 8/2009 | Bonev et al. | |
| 2009/0307003 A1 | 12/2009 | Benyamin et al. | |
| 2010/0070542 A1 | 3/2010 | Feinsmith | |
| 2010/0082376 A1 | 4/2010 | Levitt | |
| 2010/0318491 A1 * | 12/2010 | Anderson | G06Q 30/02 706/52 |
| 2011/0125678 A1 | 5/2011 | Partridge | |
| 2011/0137989 A1 | 6/2011 | Kiciman et al. | |
| 2011/0218846 A1 * | 9/2011 | Fieldman | G06Q 30/0214 705/14.16 |
| 2011/0246442 A1 | 10/2011 | Bartell | |
| 2011/0246907 A1 * | 10/2011 | Wang | G06Q 30/0224 715/751 |
| 2011/0270517 A1 | 11/2011 | Benedetti | |
| 2011/0276565 A1 | 11/2011 | Zheng et al. | |
| 2011/0289010 A1 | 11/2011 | Rankin, Jr. et al. | |
| 2012/0095976 A1 * | 4/2012 | Hebenthal | G06F 17/30867 707/706 |
| 2012/0130886 A1 | 5/2012 | Shergill et al. | |

* cited by examiner

USER INTERFACE FOR ACTIVITY STATUS AND HISTORY

CROSS-REFERENCE TO RELATED APPLICATIONS

The present application is a continuation of U.S. patent application Ser. No. 13/334,003 entitled "USER INTERFACE FOR ACTIVITY STATUS AND HISTORY," filed on Dec. 21, 2011, which in turn claims the benefit of priority under 35 U.S.C. § 119 from U.S. Provisional Patent Application Ser. No. 61/425,721 entitled "USER INTERFACE FOR ACTIVITY STATUS AND HISTORY," filed on Dec. 21, 2010, the disclosures of which are hereby incorporated by reference in their entirety for all purposes.

BACKGROUND

Unless otherwise indicated herein, the materials described in this section are not prior art to the claims in this application and are not admitted to be prior art by inclusion in this section.

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data.

SUMMARY

Disclosed herein are methods and systems that relate to an "activity assistant" that provides users with dynamically-selected "activities" that are intelligently tailored to the user's world. Accordingly, an example activity assistant may customize display of a user's activity list, suggest activities, and customize activity search results based on personalized factors such as the user's interests, current mood, and intent. Furthermore, an example activity assistant may also be capable of intelligently varying the behavior of a given activity from one user to another, depending upon the characteristics of a given user. For example, the activity assistant may score an activity based not only on the characteristics of the activity itself, but also based on data that is indicative of the user's "context" (e.g., the user's, interests, intents, moods, experiences, etc.).

According to an example embodiment, a user interface may also be provided that allows for intuitive user interaction with activities via the activity assistant. This user interface may be generally referred to herein as an "activity assistant user interface". A user typically accesses the activity assistant UI by logging in to a user's activity-assistant account. According to an example embodiment, the activity assistant UI displays graphical and textual representations of activities to a user in a logical manner that varies according to the interests, intents, and moods of the user. Via the activity assistant UI, the user may view activities they have added to a personal "activity list," view suggested activities, create and add new activities to their activity list, and/or add/delete existing activities (i.e. those created by other users) to/from their activity list, among other functions.

Configurations of the subject technology provide a user interface as disclosed herein. The user interface in some configurations includes: (a) an activity-creation display configured to create a first activity of a plurality of activities, each activity of the plurality of activities comprising a plurality of parameters, the plurality of parameters includes a status parameter, and a list of associated users, and to display the first activity; (b) a single-activity display configured to display a single activity of the plurality of activities, and information related to the list of users associated with the activity, wherein the information related to the list of users comprises inspiration information for the activity and information for each user on the list of users, the information for each user comprising a user identifier, the single-activity display comprising: (1) a parameter-entry display configured to select a parameter of the plurality of parameters for the single activity and to send a signal to the single activity corresponding to the selected parameter; (2) a heads-up display configured to send a heads-up message about the single activity to a user; (3) a location display configured to display information related to a location of the single activity; (4) a status indicator configured to display a status based on the status parameter of the single activity; and (5) a status-entry display configured to, upon selection, send a signal to change the status indicator of the single activity; (c) an activity-list display configured to display one or more activities of the plurality of activities according to a ranking, the ranking determined at least in part by one or more parameters of the displayed one or more activities, the activity-list display comprising: (1) a timeline display configured to generate a time-based display of the one or more activities, wherein the ranking for the timeline display is based at least in part on the status parameters of the one or more activities and/or the time-related parameters of the one or more activities; and (2) a life-list display configured to generate an importance based display of the one or more activities, wherein the ranking for the life-list display is based at least in part on information stored in a profile for a user, wherein the profile for the user comprises at least a mood parameter, a location parameter, and a time-related parameter; and (d) an activity-search display configured to receive at least one activity-search keyword, to generate a query of the plurality of activities based on the activity-search keyword, and to retrieve one or more search-related activities of the plurality of activities ordered according to a search-related ranking based on the activity-search keyword, wherein the activity-list display is further configured to display the one or more search-related activities.

BRIEF DESCRIPTION OF THE FIGURES

FIG. 6 depicts a timeline of activities based on parameters set by a user. For example, some activities have been discarded, while others have been recently done.

FIG. 20 depicts an example activity-assistant user interface.

DETAILED DESCRIPTION

Figure 1:
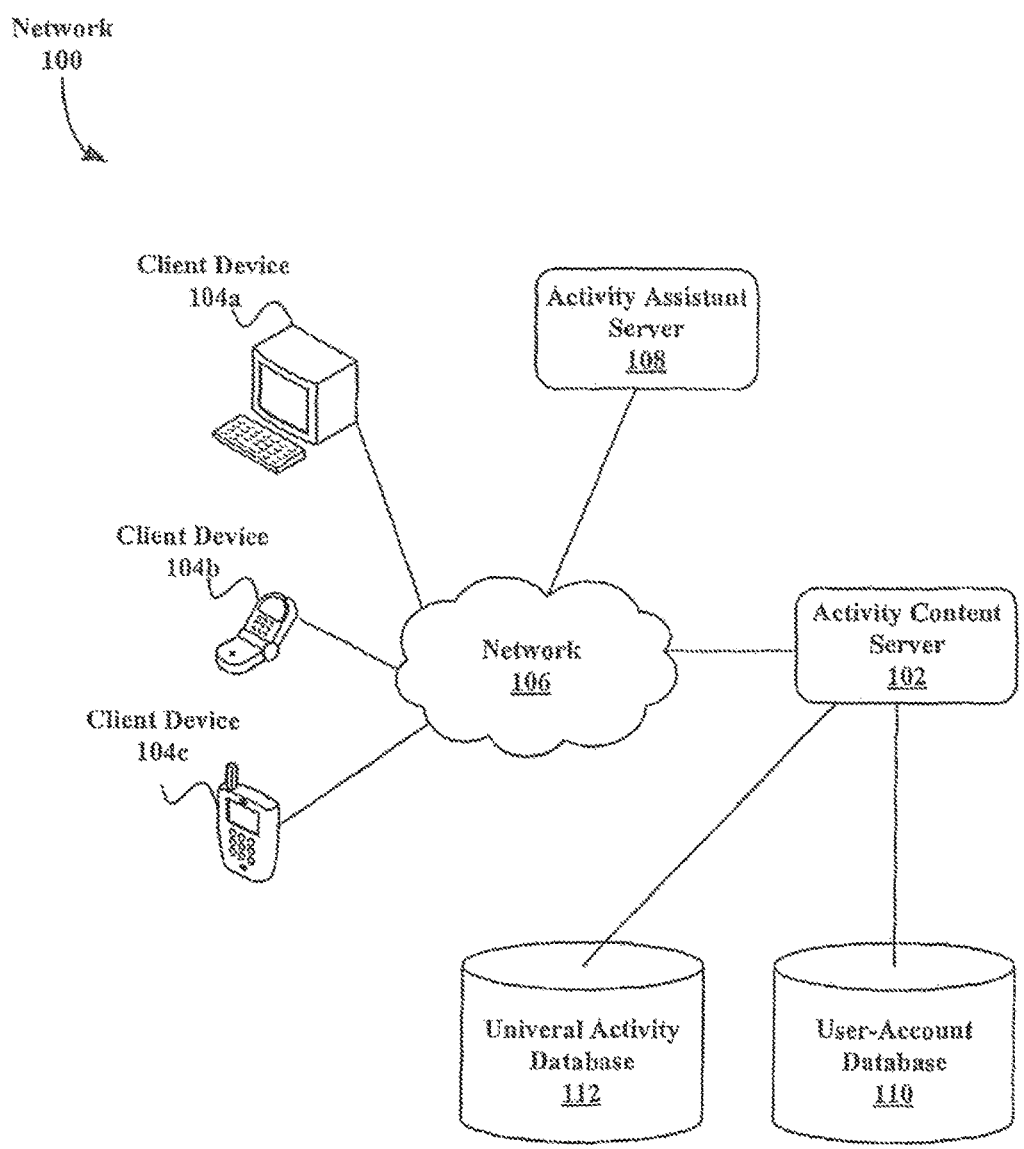
FIG. 1 depicts a network in accordance with an example embodiment.

The following detailed description describes various features and functions of the example systems, devices, and methods with reference to the accompanying figures. It should be understood that the word "example" is used herein to mean "serving as an example, instance, or illustration." Any embodiment described herein as "example" is not necessarily to be construed as preferred or advantageous over other embodiments. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

An "activity," as used herein, can be a data construct describing a thing to do, which a user can associate with a user's "activity-assistant account." In an example embodiment, an activity is defined at least in part by one or more singular, global activity parameters. For example, global parameters for a given activity may include: (a) a title or text description (e.g., "get brunch at Boogaloo's restaurant"), (b) data indicating the location that is associated with the activity (e.g., a latitude/longitude and/or a street address of Boogaloo's restaurant), (c) data indicating one or more user "moods" that may be indicative of the activity being more or less well-suited for a given user at a given point in time (e.g., "fun", "social", "cerebral", "productive", "ambitious", etc.), (d) data indicating time constraints on the activity (e.g., the hours that Boogaloo's restaurant is open and/or the hours during which Boogaloo's restaurant serves brunch), and/or (e) any other data that may be directly or indirectly interpreted to affect the importance of a given activity to a given user.

Generally, an activity is a user-defined construct, and thus the global parameters that define each activity may vary. In particular, a given activity may include all of the above-mentioned global activity parameters, a subset of the above-mentioned parameters, or none of the above-mentioned parameters. For example, a user may create an activity that is not tied to any particular location (e.g., "do homework for math class"), and thus choose not to provide a location. Furthermore, as activities are flexible and dynamic constructs, it should be understood that the above-mentioned examples of global parameters are not limiting. It is also possible that an activity may be generated by a computing system without any initial user input (or alternatively, generated based on some user-provided input).

Once an activity is created, its global parameters may be applied to all users who add the activity or become associated with the activity. Thus, in effect, there is a single copy of each activity and its global parameters that is common to all those users. It should be understood, however, that global parameters can still be flexible and dynamic, and may change over time in relation to the activity. For example, a "popularity" parameter may be defined for an activity that is updated on an ongoing basis to reflect the number of users that have added the activity.

To further allow for customization of activities to a particular user, "user-specific" parameters, which vary between users, may be defined for an activity. Accordingly, while the global parameters of an activity are the same for all users, each user that adds an activity may customize their user-specific parameters for the activity. For instance, user-specific parameters may be used to specify: (a) plans regarding the activity (e.g., "I want to do it", "I want to do it again, but not for a few weeks," "I must do it before December 25," "I never want to do it again." etc.), (b) the user's history regarding that activity (e.g., I went there with Lauren on November 4 and again with Ryan on November 28), (c) personal time constraints based on user preferences (e.g., preference of brunch early on Sunday so that time is available to digest before yoga class at noon), and/or (d) any other personal preferences that may overrides or modify the global parameters (e.g., "I like to go to Boogaloo's restaurant when I'm sad because it cheers me up," "I like to go to Boogaloo's restaurant when I have friends in town," etc.).

In a further aspect, an activity may be designated as a "public" or "private" activity. Depending on how a given activity is defined, this designation may be made by setting a global parameter when the activity is created (and thus apply to all users who add the activity), and/or may be made via a user-specific parameter that is settable by each user who adds an activity.

An activity that is designated as "public" via a global parameter may be viewable (and thus addable) to all users, whereas an activity that is designated as "private" via a global parameter may only be viewable to the creator of the activity. In an example embodiment, a global parameter may be set to designate an activity as a "private shared" activity, in which case the activity may only be viewable by the author and the users the author specifies. Further, the fact that a given activity is designated as "public," "private," or "private shared" via a global parameter may be interpreted as a signal relevant to the importance of the activity to a certain user.

When an activity is designated as "private" via a user-specific parameter, other users are generally not notified that the user has added the activity. And when an activity is designated as "public" via a user-specific parameter, other users may be notified and/or be able to see that the user has added the activity. Further, when an activity is designated as "public" via a user-specific parameter, the user may be able to define which other users can view and/or which other users should be notified that they have added the activity.

In an example embodiment, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time. As used herein, the phrase "user interface" refers to a graphical user interface (GUI) that can include different sets of graphical elements. A graphical element can include, but is not limited to, a button, check box, radio button, slider, list box, drop-down list, menu, combo box, icon, text box, scroll bar, etc.

In order to quantify the importance of a particular activity for a particular user, the activity assistant may identify and/or determine any number of "signals" that may be directly or indirectly relevant to the importance of an activity to the particular user. From the perspective of the activity assistant, signals may take the form of information provided by global parameters and user-specific parameters taken individually or information determined by evaluating interactions between global parameters, user-specific parameters, and/or other data sources. The activity assistant may evaluate the signals for a particular combination of user and activity, and based on the signals, quantify the importance of the particular activity for the particular user (e.g., by assigning a "score" to the activity).

To provide some examples of such signals, they may include but are not limited to: (a) the level of similarity between user's mood and activity mood, (b) the level of similarity between the user's context (as indicated by user-specific signals and/or user-specific parameters indicating, for example, whether the user is on a desktop computer/mobile phone, on-line/off-line, talking on the phone, driving, walking, etc.) and corresponding activity context requirements and/or restrictions (as indicated by global parameters of the activity), (c) a distance between the user's current detected (or indicated) location and the activity location (if available), (d) the appropriateness of the activity for the current weather conditions at the user's current or indicated location and/or the current weather conditions at the activity's indicated location (e.g., rainy, sunny, snowy, etc.), (e) a user-designated priority for the activity, (f) a user-designated due date (or next due date, if recurring), (f) a user's snooze history or pattern for the activity, (g) an amount of time required for the activity, (h) a progress or status of the activity (e.g., done/completed, active, in-progress, etc.), (i) ownership of the activity (e.g., whether the owner is the particular user in question or another user), (j) whether the user received an invitation to the activity or just a notice that the activity exists (e.g., a "heads-up"), (k) a popularity of the activity (e.g., number of comments on an activity, or the number of people who have commented, copied, liked, shared, done/completed, or followed the activity), (l) a similarity between a user query string and the activity text (for search/suggest), (m) a similarity between a user query string and the names or c-mails of other users associated with the activity (for search/suggest), (n) a similarity between user query string and activity comment text (for search/suggest), and (o) whether the user indicated another user with whom to participate in the activity with. Other possibilities exist as well.

Supported with this intelligence from the activity assistant, the activity assistant user interface may present activities that a particular user has associated with their account in a logical order that is based at least in part upon the relative importance of the activities to the user. In particular, the activity assistant may evaluate the signals for each activity in a user's activity list (e.g., each activity that has been added by the user) and assign a score to the activity. The activity assistant can then rank the activities in the user's activity list according to their respectively determined score, and relay this information to the activity assistant user interface so that it can adjust the displayed activity list accordingly.

Further, the intelligence of the activity assistant may be utilized to provide "suggested" activities that are tailored to the particular user's preferences, tendencies, location, time table, associated other users, and/or mood at a given point in time. In particular, the activity assistant may initiate an activity search that takes into account the scores of activities when ranking the search results, and these search results may be presented to the user via the activity assistant user interface. In a similar manner, the activity assistant may support an "activity search" feature of the activity assistant user interface. This feature may allow the user to enter text and initiate an activity search on the text, the results of which factor in the relative scores of activities as assessed by the activity assistant.

According to an example embodiment, a user interface is provided that allows for intuitive user interaction with such activities. This user interface may be generally referred to herein as an "activity assistant user interface". A user typically accesses the activity assistant user interface by logging in to a user's activity-assistant account. According to an example embodiment, the activity assistant user interface displays graphical representations of activities to a user in a logical manner that varies according to the interests, intents, associations with other users, and moods of the user. Via the activity assistant user interface, the user may view activities they have added to a personal "activity list," view suggested activities, create and add new activities to their activity list, and/or add/delete existing activities (e.g., those created by other users) to/from their activity list, among other functions.

In some embodiments, the activity assistant user interface may help a user to visualize (a) how the user has been spending his or her time; and (b) how the user could be spending his or hers time in the future.

In some embodiments, a user may mark activities "I did it" one or more times and tag activities with a date window in which the activities can be done or must be done using the activity assistant user interface. In the context of the activity assistant described herein, the term "done" (and other grammatical form variations of "done") refers to a status of a corresponding activity (or activities) that has been completed by one or more users.

In some embodiments, the activity assistant may create a timeline view of what the user has done recently using the activity assistant user interface. Furthermore, the activity assistant user interface may classify activities done using stock categories ("productive", "fun") or more user specific/ custom categories ("stuff with kids". "homeowner stuff", "Christmas shopping"), and show the breakdown of things done by category. For a given time window in the future, the activity assistant user interface may show things that "must be done" in that time window and other things that "could be done" in that time window.

In some embodiments, the activity assistant user interface may allow for input of user-provided static signals related to state of activity. In other embodiments, the activity assistant may update both the "TO DO" list and history based on the static signals, and then update display in the activity assistant user interface.

In other embodiments, the activity assistant user interface may allow for input of activity type (i.e., stock category) and may further use the type of activity to update display base "TO DO" list and history, and display the list and the history using the activity assistant user interface.

Example Network Architecture of Activity Assistant

Turning to the figures, FIG. 1 depicts a network in accordance with an example embodiment. In network 100, activity assistant server 108 and possibly activity content server 102 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Activity content server 102 can provide content to client device 104a-104c and/or activity assistant server 108. The content can include, but is not limited to, web pages, hypertext, scripts, binary data such as compiled software, images, audio, and/or video. The content can include compressed and/or uncompressed content and/or encrypted and/or unencrypted content. Other types of content are possible as well.

In an alternative arrangement, activity assistant server 108 and activity content server 102 can be co-located and/or combined as a common server. Further, it also possible that activity assistant server 108 and/or activity content server 102 can be accessible via a network separate from the network 106. Yet further, although FIG. 1 only shows three client devices, activity assistant server 108 and/or activity content server 102 can serve any number of client devices (from a single client device to hundreds, thousands, or even more client devices).

Global activity database 112 typically includes activity data that defines a plurality of activities. In particular, the activity data for each activity may include one or more global activity parameters that collectively define the global context for the activity. Further, user-account database 110 may include per-account data for users' activity accounts. This per-account data may include, for a given one of the accounts, data indicating user-specific parameters and signals. Further, for a given activity account, the per-account data may include an indication of which activities, if any, are associated with the account (e.g., the activities that a user has added to their activity list).

According to an example embodiment, activity assistant server 108 embodies the "activity assistant" and thus is configured to provide the activity-assistant functionality described herein. In particular, activity assistant server 108 may be configured to identify signals relating to the importance of a particular activity to a particular user (e.g., relating to a given user-activity pair), so that activities can be logically displayed to a user, suggested to a user, and/or searched for a user via an activity assistant user interface.

In some embodiments, activity-assistant functionality described herein may also be performed by software on the device such as, but not limited to, devices 104a, 104b, and 104c as shown in FIG. 1. For example, the client software running on the device such as, but not limited to, devices 104a, 104b, and 104c as shown in FIG. 1 may perform all or some portion of the ranking functionality and/or provide more advanced assistance, e.g. by providing a latitude/ longitude and/or map for an address entered by the user via an activity assistant user interface and/or by directly communicating with a activity assistant processing system.

The activity assistant server 108 may acquire the data from which signals are determined, and/or data directly providing signals, from a number of different data sources. For example, activity content server 102 may provide activity assistant server 108 with access to global activity database 112 and user-account database 110. Thus, when evaluating the importance of a particular activity to a particular user, activity assistant server 108 may retrieve the global parameters of the activity from global activity database 112, as well as user-specific parameters from user-account database 110.

Figure 2A:
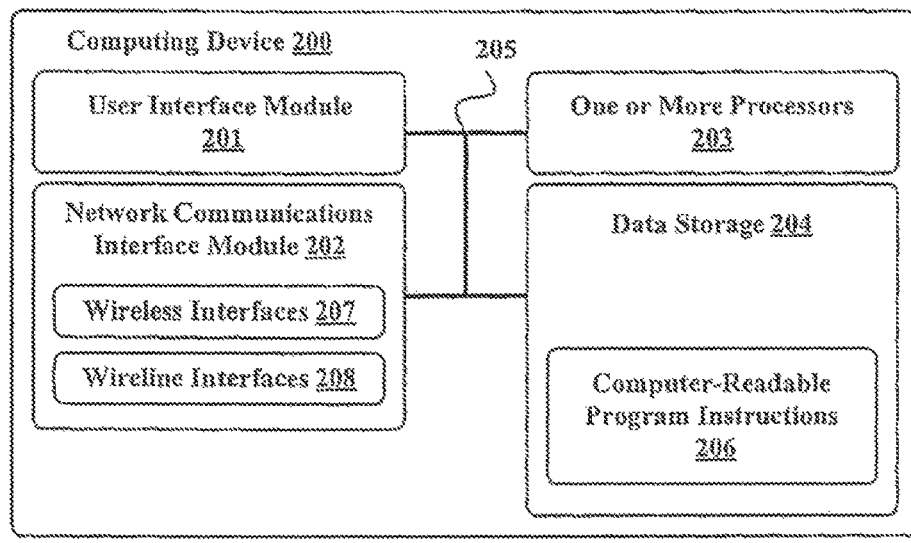
FIG. 2A is a block diagram of a computing device in accordance with an example embodiment.

FIG. 2A is a block diagram of a computing device 200 in accordance with an example embodiment. Computing device 200 can be configured to perform one or more functions of activity content server 102, client devices 104a, 104b, and 104c, activity assistant server 108, user account datastore 110, and/or universal activity datastore 112. The computing device 200 can include a user interface module 201, a network-communication interface module 202, one or more processors 203, and data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, a microphone, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to receive audible input(s) via the microphone (or similar audio input device) and/or generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, or 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some embodiments, the data storage 204 can be implemented using a single physical device (e.g., one optical, magnetic, organic or other memory or disc storage unit), while in other embodiments, the data storage 204 can be implemented using two or more physical devices.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some embodiments, the data storage 204 can additionally include storage required to perform at least part of the herein-described techniques, methods (e.g., method 800), and/or at least part of the functionality of the herein-described devices and networks.

Figure 2B:
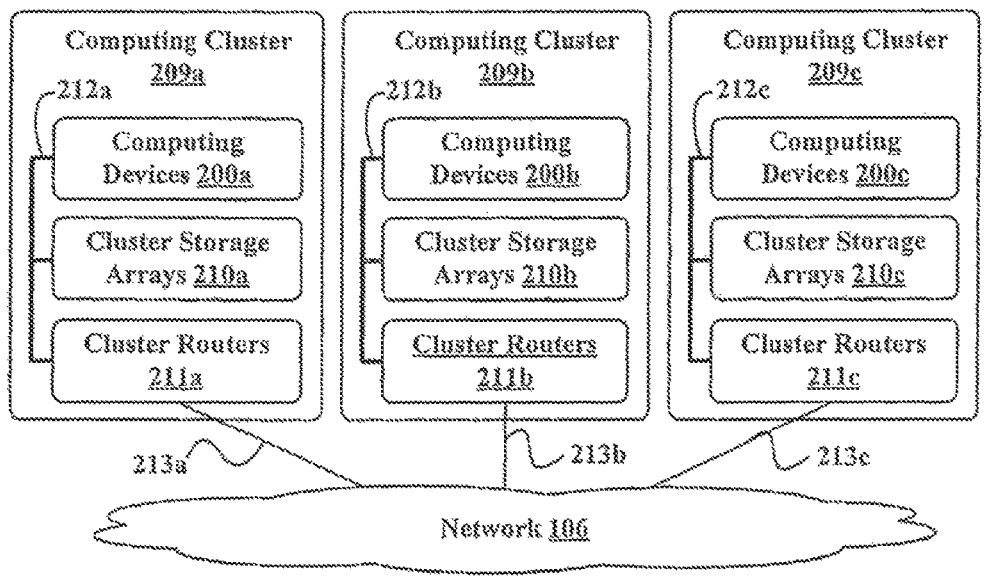
FIG. 2B depicts a network with computing clusters in accordance with an example embodiment.

FIG. 2B depicts a network 106 with computing clusters 209a, 209b, and 209c in accordance with an example embodiment. In FIG. 2B, functions of activity content server 102, activity assistant server 108, user account datastore 110, and/or universal activity datastore 112 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some embodiments, each of computing clusters 209a, 209b, and 209c can have an equal number of computing devices, an equal number of cluster storage arrays, and an equal number of cluster routers. In other embodiments, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of activity content server 102. In one embodiment, the various functionalities of activity content server 102 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with activity assistant server 108. Computing devices 200b and 200c in computing clusters 209b and 209c can be configured the same or similarly to the computing devices 200a in computing cluster 209a.

On the other hand, in some embodiments, computing devices 200a, 200b, and 200c each can be configured to perform different functions. For example, computing devices 200a and 200b can be configured to perform one or more functions of user-account datastore 110, and the computing devices 200c can be configured to perform one or more functions of activity assistant server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of activity content server 102, activity assistant server 108, user account datastore 110, and/or universal activity datastore 112 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for activity assistant server 108, while other cluster storage arrays can store data for activity content server 102. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some embodiments, computing tasks and stored data associated with activity content server 102, activity assistant server 108, user account datastore 110, and/or universal activity datastore 112 can be distributed across the computing devices 200a, 200b, and 200c based at least in part on the processing requirements for functions of activity content server 102, activity assistant server 108, user account datastore 110, and/or universal activity datastore 112, the processing capabilities of the computing devices 200a, 200b, and 200c, the latency of the local cluster networks 212a, 212b, and 212c, the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Example User Interface for Activity Assistant

Figure 3A:
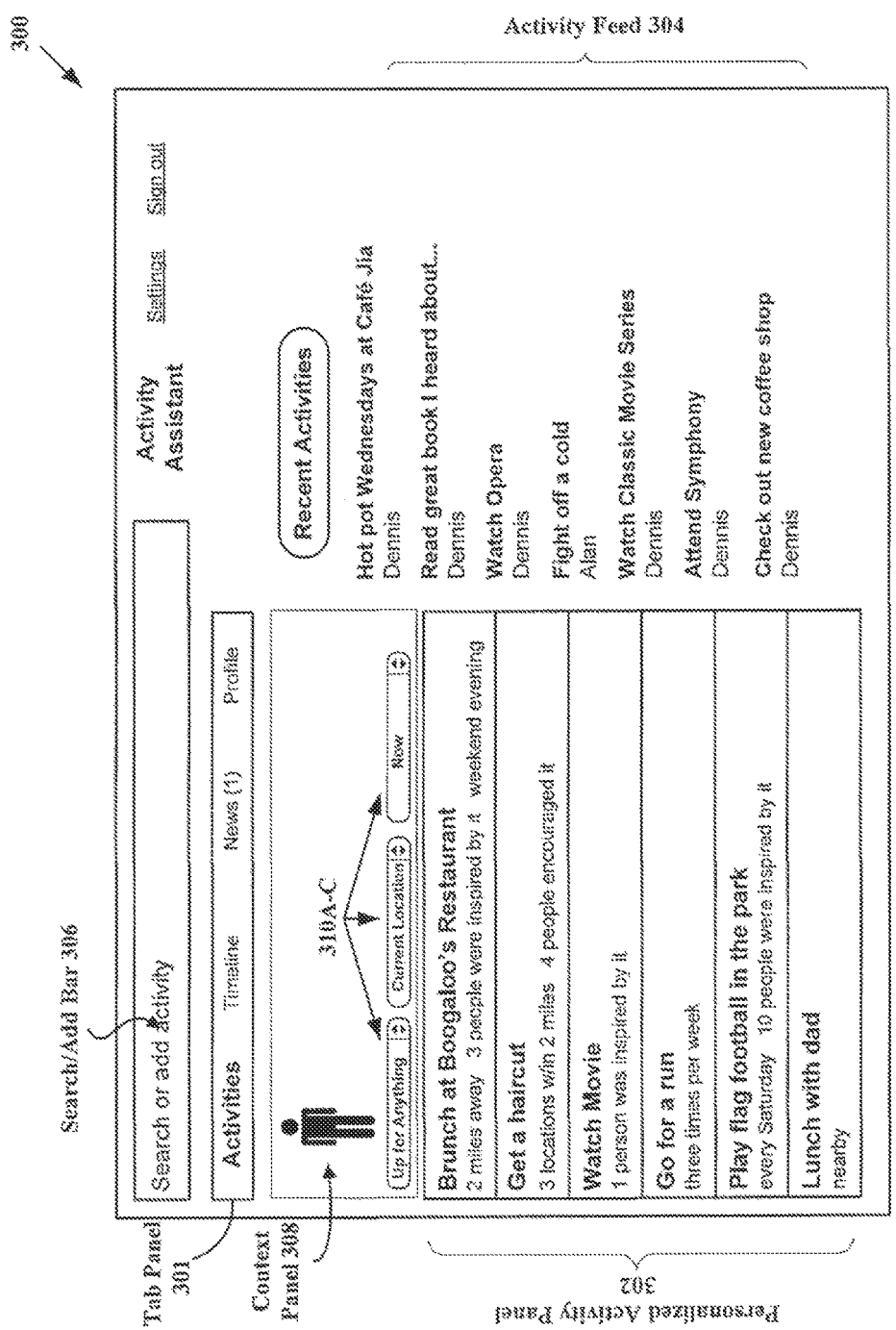
FIG. 3A is a block diagram illustrating features of a user interface, according to an example embodiment.

FIG. 3A is a block diagram illustrating features of a user interface, according to an example embodiment. In particular, activity-assistant user interface 300 may be displayed via a client device once a user has logged in to their activity-assistant account, and may allow a user to interact with an activity assistant. While only one screen of the activity-assistant user interface 300 is shown, it should be understood that the activity-assistant user interface may include other screens, which provide additional functionality, without departing from the scope of the invention. As shown, activity-assistant user interface 300 includes a personalized activity panel 302, an activity feed 304 that displays activities that have been added, done, and/or recently updated by friends of the user (or members of the user's social graph and/or social network), a search/add bar 306, and a context panel 308. Further, context panel 308 includes a number of input mechanisms 310 A-C via which a user can input context signals.

The tab menu panel 301 acts as a menu selection bar, and may determine the content of the remainder of the user interface 300. As shown in FIG. 3A, the Activities tab is currently selected, and as a result, the personalized activity panel 302 and the activity feed 304 are displayed. The Timeline tab may bring up a time-based ordering of activities. The News tab may bring up a listing of activities, announcements, and/or actions (e.g., "today your friend did the activity 'watch movie' that you inspired him/her to add") of other users with which the current user is associated. The profile tab may allow the current user to modify settings, such as login preferences, display settings, and/or how the current user's information appears to other users (name, privacy settings, etc.), among others. In some embodiments, a subset of the tabs illustrated in FIG. 3A may be provided, and in other embodiments, a superset of the tabs may be provided.

The context panel 308 provides an interactive mechanism for users to provide context signal data that describes a "user context" (e.g. to provide signals indicative of the user's intent, interest, mood, state-of-mind, experience, perception, associations with other users, etc.). In the illustrated example, input mechanism 310A on the left of context panel 308 allows a user to signal their mood (e.g., "up for anything", "lazy", "productive", "social", etc.). The input mechanism 310B in the center of context panel 308 allows a user to signal a location (e.g., "current location", "home", "work", "stadium", etc.). Further, input mechanism 310C on the right of context panel 308 allows a user to signal a time or timeframe (e.g., "now", "tomorrow", "tonight", "next Wednesday morning", "2:00 AM CST", "9:00 PM EST on Saturday", etc.). Other input mechanisms are possible as well.

While the context information provided via the input mechanisms of the context panel 308 may be referred to as "signals" from the user, it should be understood that, programmatically, this information may take the form of user-specific parameters that are associated with the user's activity account. As such, the data provided via input mechanisms 310A-C may be stored in a user-account database. For example, referring back to FIG. 1, data from input mechanisms 310A-C may be stored as user-specific parameters in user-account database 110. It is also possible that activity assistant server 108 may be fed data or may pull data directly from input mechanisms 310 in real-time.

The context signal data acquired from the context panel 308 (e.g., user-specific parameters related to "user context") may be combined by the activity assistant (e.g., activity-assistant server 108 and/or activity content server 102) with global parameters of a given activity, other user-specific parameters, and/or data from other sources, in order to derive signals indicative of activity-importance of the given activity to the user. In this context, the "signals" are the information relative to the importance of the activity that is derived from the data (e.g., the user-specific parameters, global parameters, etc.). As such, the activity assistant may interpret a user-parameter as a signal in and of itself.

For instance, the user's mood (provided via input mechanism 310A) may be interpreted as a signal that makes any number of activities more or less important for the user. As a specific example, if the user's mood is "lazy", the activity "watching a movie" may become more important than it otherwise would be (as global parameters may indicate that "lazy" is a mood associated with the "watching a movie" activity). On the other hand, the activity "go to the gym" may become less important than it otherwise would be (as global parameters of "watching a movie" do not typically include "lazy" as an associated mood, or may in fact indicate that "lazy" is a mood that is likely incompatible with this activity).

The activity assistant may also derive more complex signals by evaluating the relationships and/or interactions between user-specific parameters, global parameters, and/or other data items. To provide an example, a user may have provided a "love being outdoors" signal, which may be stored in the user's account as a user-specific parameter (note that a user interface input mechanism not shown on the user interface 300, but is contemplated as being available). At a given point in time, the user also may have set their mood to "active" via input mechanism 310A, set their location to "current location" via input mechanism 310B, and set their time to "tomorrow afternoon". The activity assistant may interpret this data as including a signal that the user would like to do something active tomorrow afternoon at the same place they are currently located.

Further, the activity assistant may use other data sources to determine other relevant signals, such as the weather forecast for the next day at the user's current location or the location that the user will likely be at the next day. Tomorrow afternoon's weather forecast may thus be a signal, which can be combined with the signal derived from the user-specific parameters to provide a more-refined signal that, for example, outdoor fitness or sporting activities near the user's location should always be favored over indoor fitness or sporting activities near the user's location, unless the tomorrow afternoon's forecast is for rain, in which case the amount by which outdoor activities are favored over indoor activities may be reduced (or indoor activities may actually be favored). For instance, combining all of this information, the activity assistant may increase the importance of active outdoor activities (e.g., "go for a run", "play flag football", etc.) to a greater extent when the forecast is for sunny weather, than when the forecast is for rain or snow.

The activity assistant may apply signal-based techniques, such as those described herein, to assess activity-importance for a number of activities and the importance of these activities relative to one another. This technique may be employed to provide the user with various functions that are tailored to the user's context.

For example, personalized activity panel 302 may display intelligently selected and ordered activities from a pool of activities including the activities a user has added to their account and suggested activities that have been selected for a user. For example, a number of suggested activities may be determined based on factors such as user preferences, signals from the context panel, global parameters of potential activities, activities that have been added and/or done by friends of the user, and/or activities that have been added and/or done by the user in the past, among others. These suggested activities may then be combined with the activities a user has already added to create a pool of potential activities for the personalized activity panel 302. Then, to determine which specific activities to display in personalized activity panel 302, the activity assistant may quantify the importance of each activity (e.g., by evaluating signals for each activity), so that the activities that are most important to the user are displayed.

Note that personalized activity panel 302 may visually differentiate between activities that a user has already added to their account, and suggested activities. For example, the "Watch Movie" activity is displayed with a dark background and white text to indicate that it is a suggested activity (and that the user may thus wish to add it), whereas the other activities listed in personalized activity panel 302 all have a white background with black text, thus indicating that the user has already added these activities.

Further, the evaluation of importance may also be applied in the process of determining which activities should be displayed in the activity feed 304 (and possibly the order in which those activities are displayed). In particular, a certain number of the most recently-added and updated activities may be evaluated based on signals such as those described above, and the most important of the recent activities may be displayed (possibly in the order of importance. Alternatively, it should be understood that activity feed 304 may simply display activities in a time-wise manner as they are added/updated/completed, without adjusting based on the user's context. In a similar manner, search results (not shown) for an activity search via search/add bar 306 may be displayed based at least in part on importance of the activities located in the search, or may simply be displayed in an order according to one of the many well-known search techniques.

Figure 3B:
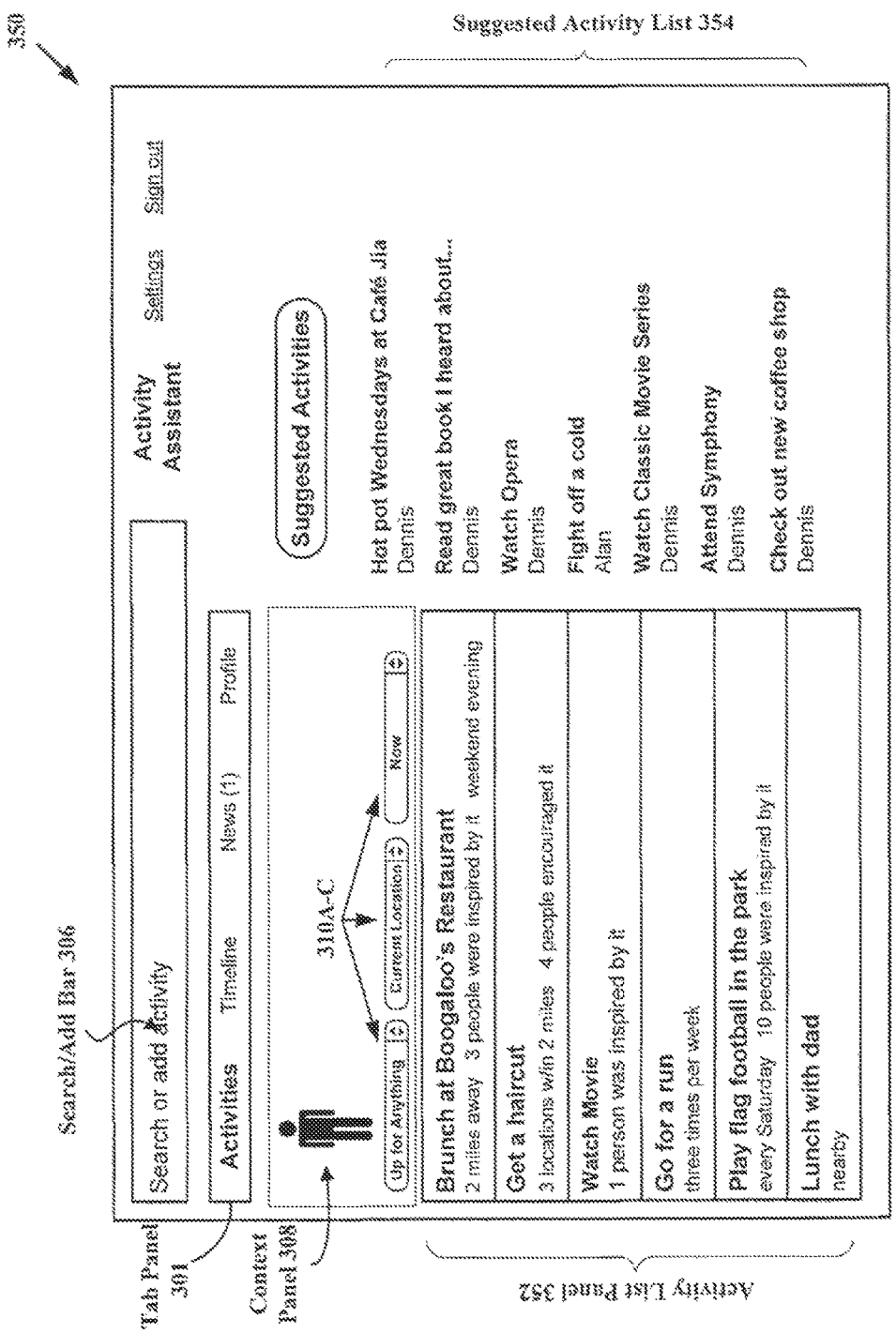
FIG. 3B is another block diagram illustrating features of a user interface, according to an example embodiment.

FIG. 3B is another block diagram illustrating features of a user interface, according to an example embodiment. In particular, FIG. 3B illustrates an alternative activity-assistant user interface 350, which may be displayed via a client device once a user has logged in to their activity-assistant account. Activity-assistant user interface 350 includes some of the same UI elements as activity-assistant user interface 300 of FIG. 3A (e.g., search/add bar 306 and context panel 308 including a number of input mechanisms 310 A-C). However, activity-assistant user interface 350 includes an activity list 352 and a suggested activity list 354.

In this embodiment, activity list 352 may include only activities that a user has added to their account. Thus, by evaluating signals for each activity a user has added to their account, the activity assistant can determine which activities should be displayed in activity list 352 (and the order in which those activities should be displayed).

Furthermore, suggested activity list 354 may display only suggested activities (which have not yet been added by the user.) Accordingly, the importance of specific activities may also be a factor in the process of determining which activities should be displayed in the suggested activity list 354 (and the order of those activities).

Figure 4:
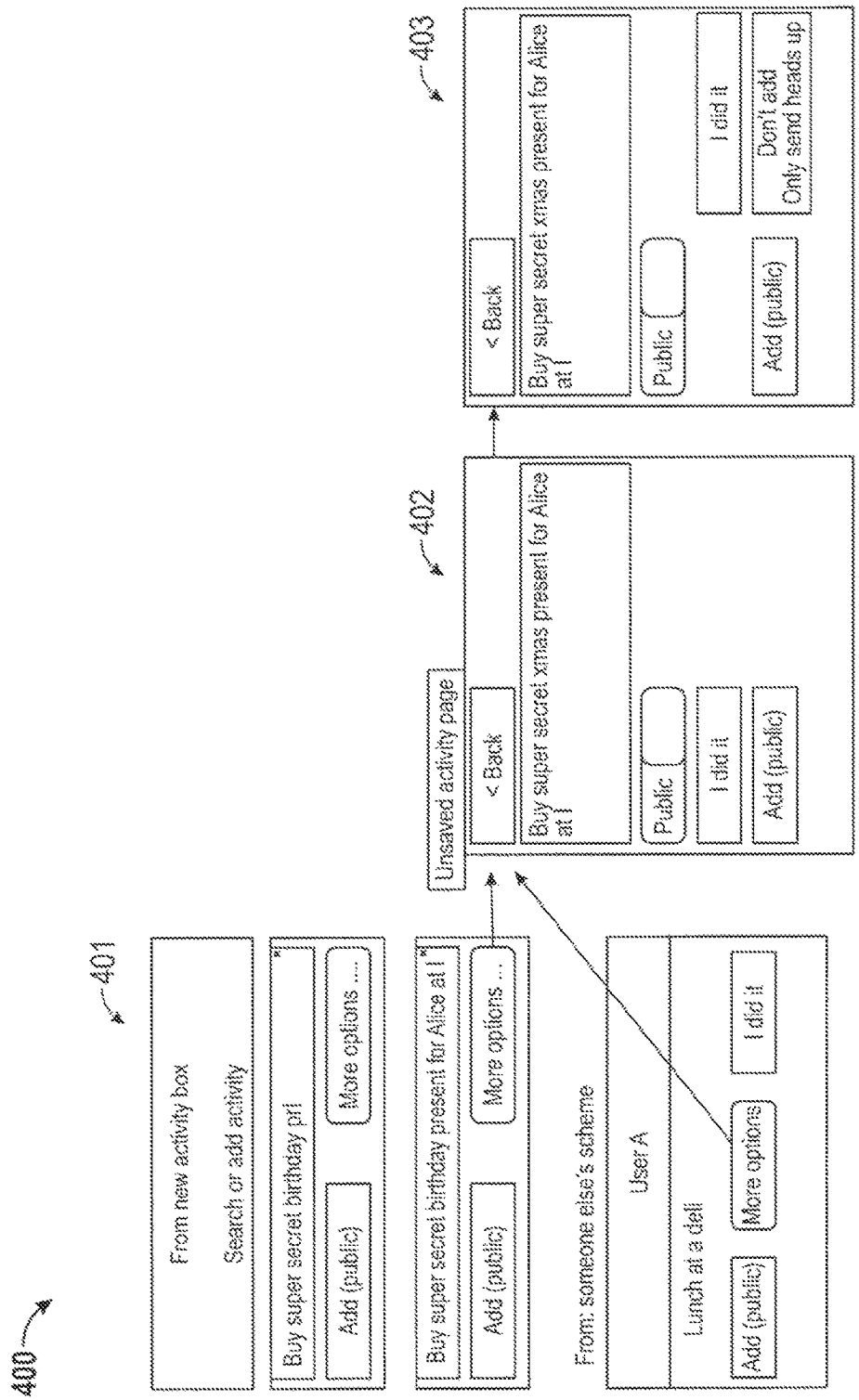
FIG. 4 depicts one embodiment of a user creating a new activity.

In some embodiments, a user may create a new activity using the activity assistant user interface, as shown in FIG. 4. The creation of a new activity, as shown in display 401, may create a new global activity parameter for use with the activity assistant. Display 402 shows an example dialog for entering data related to the newly created activity. Additional users can be informed about this newly created activity using the "Add (public)" button shown in display 402. FIG. 4 shows display 403 generated with the "Don't Add" button shown in FIG. 4 after adding one or more additional users.

Figure 5:
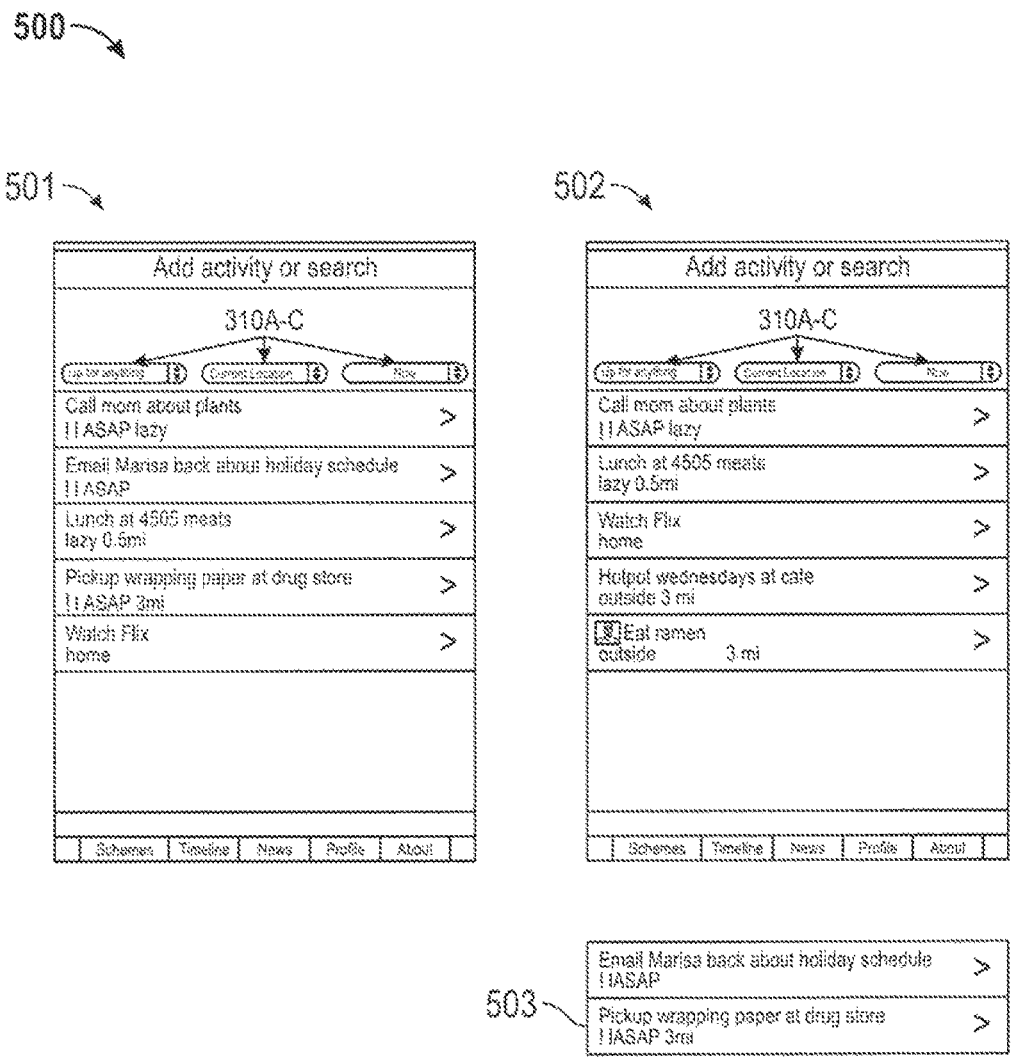
FIG. 5 depicts a user entering a user-specific parameter, such as lazy, into the activity-assistant user interface.

In other embodiments, a user may enter a user-specific parameter, such as a lazy mood, into the activity-assistant user interface, as shown in display 501 of FIG. 5. When a user selects a parameter, a signal is generated causing the activity assistant to change the activity list in response to a chosen user-specific parameter. Display 502 shows the updated activity list after entering the "lazy mood" parameter. The updated activity list shows two new activities from those shown in display 501: a "Hotpot Wednesdays" activity and an "Eat Ramen" activity. FIG. 5 shows list 503 with two activities not indicated in the updated activity list shown in display 502, since the illustrated "Email Marisa" and "Pick up wrapping paper" activities do not match the "lazy mood" parameter.

Figure 6:
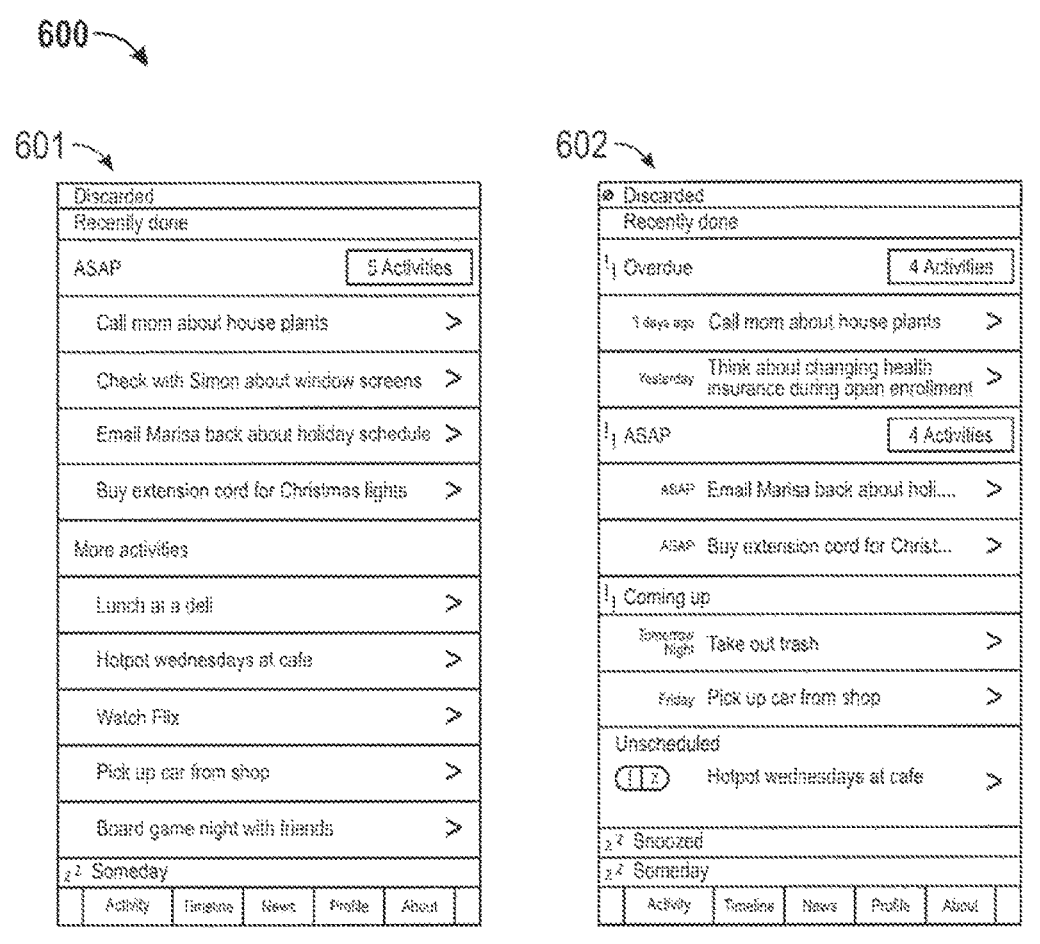

In other embodiments, the activity assistant may keep a timeline of activities based on parameters set by a user using the activity assistant user interface, as shown in display 601 of FIG. 6. For example, some activities have been discarded, while others have been recently done. Further, the timeline may identify activities to be completed as soon as possible ("ASAP") and identify upcoming activities. In some embodiments, such as display 602, the timeline may also include activities with less specific time-parameters, such as unscheduled activities, activities that have been "snoozed," and activities that may be of a low priority for completion "someday."

Figure 7:
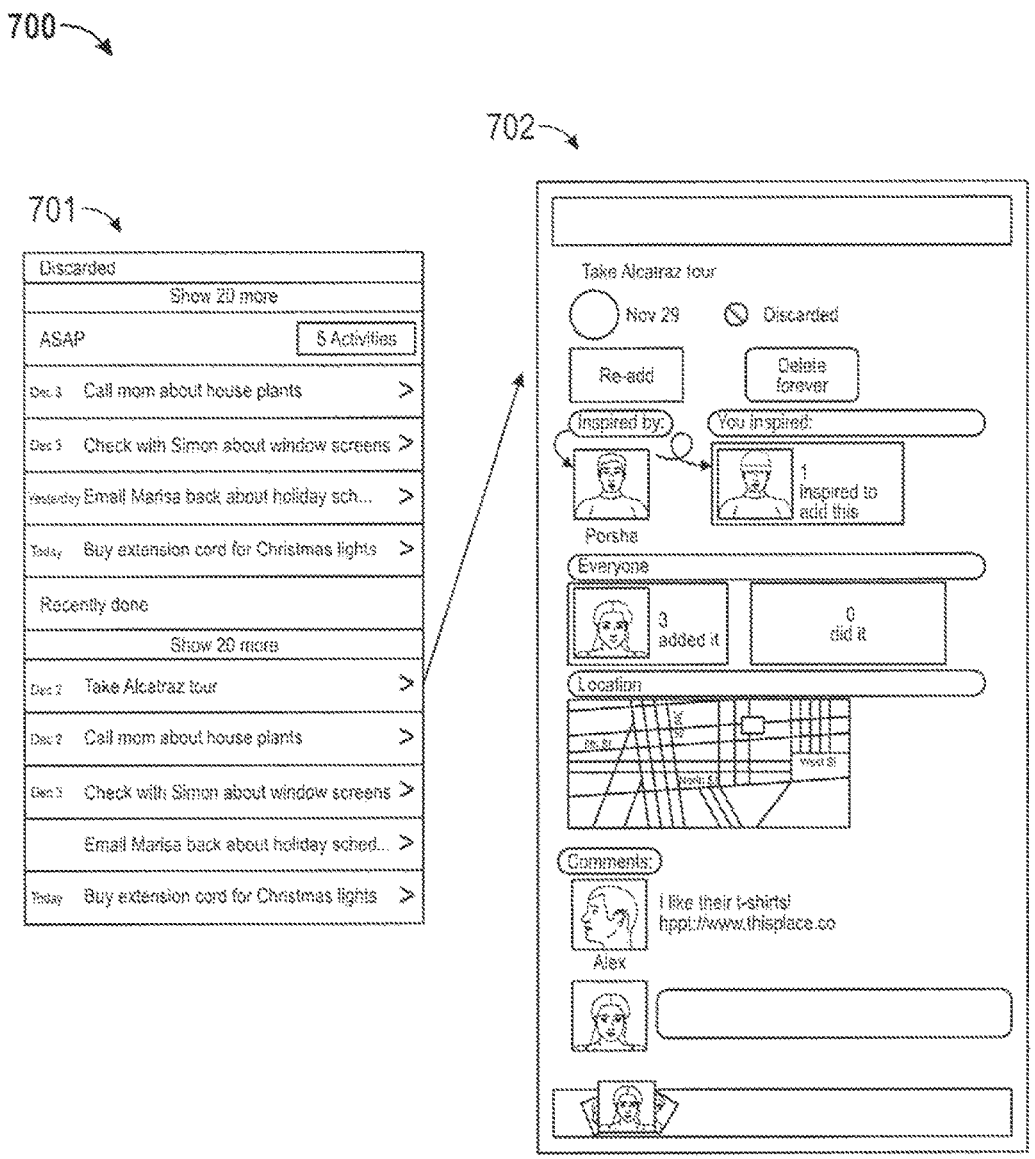
FIG. 7 depicts a timeline of activities based on parameters set by a user.

In some embodiments, the activity assistant may keep a timeline of activities based on parameters set by a user using the activity assistant user interface. As shown in FIG. 7, when an activity is either "done" or "discarded" as shown in display 701, may be selected as re-added to a users timeline of possible activities using the "Re-add" button shown in display 702. For example, a user may want to take a specific tour again or see a movie for a second time. The activity that once was "done" may be returned to the list of activities. Additionally, when an activity is selected, the activity-assistant user interface may return global parameter data relating to the specific activity. For example, a user could see other user who completed an activity. Moreover, a user can see who "inspired" him to add the activity and who he "inspired" to add the activity.

Figure 8:
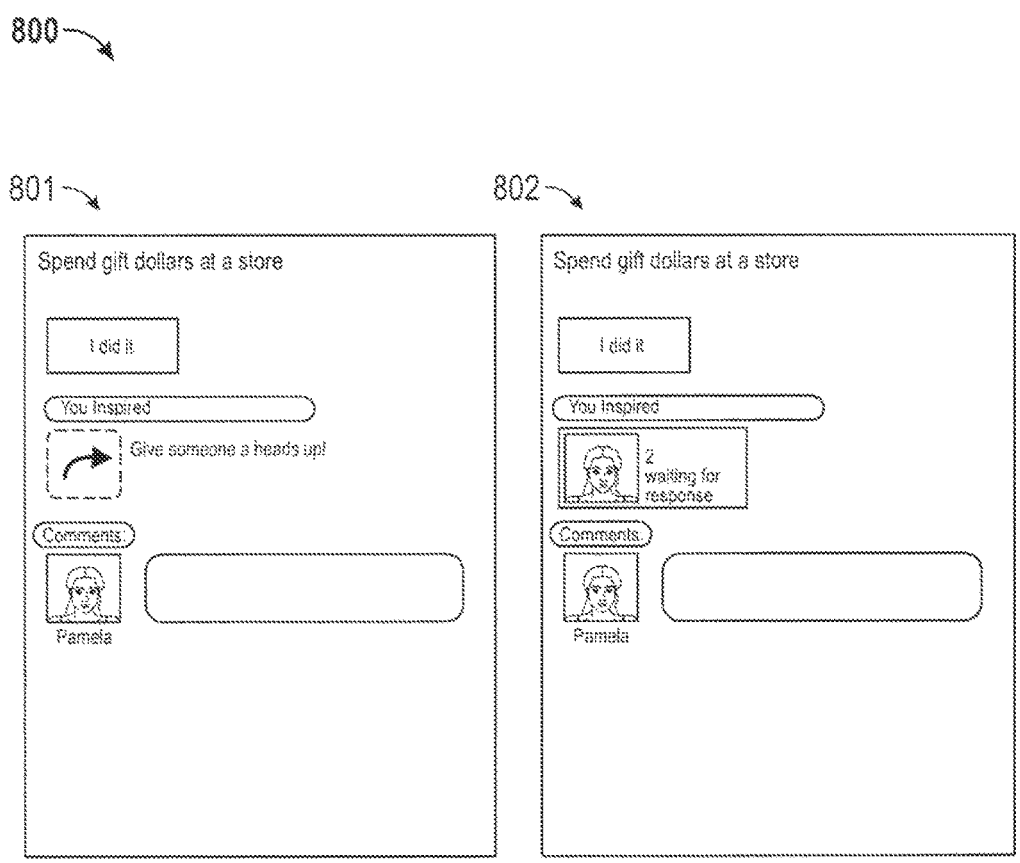
FIG. 8 depicts the addition of additional users to a specific activity.

In some embodiments, a user may add additional users to a specific activity using the activity assistant user interface, as shown in FIG. 8. If a specific user thinks additional users may be interested in an activity, he can "inspire" the additional users to add the specific activity to their list of activities, as shown in display 802 of FIG. 8.

Figure 9:
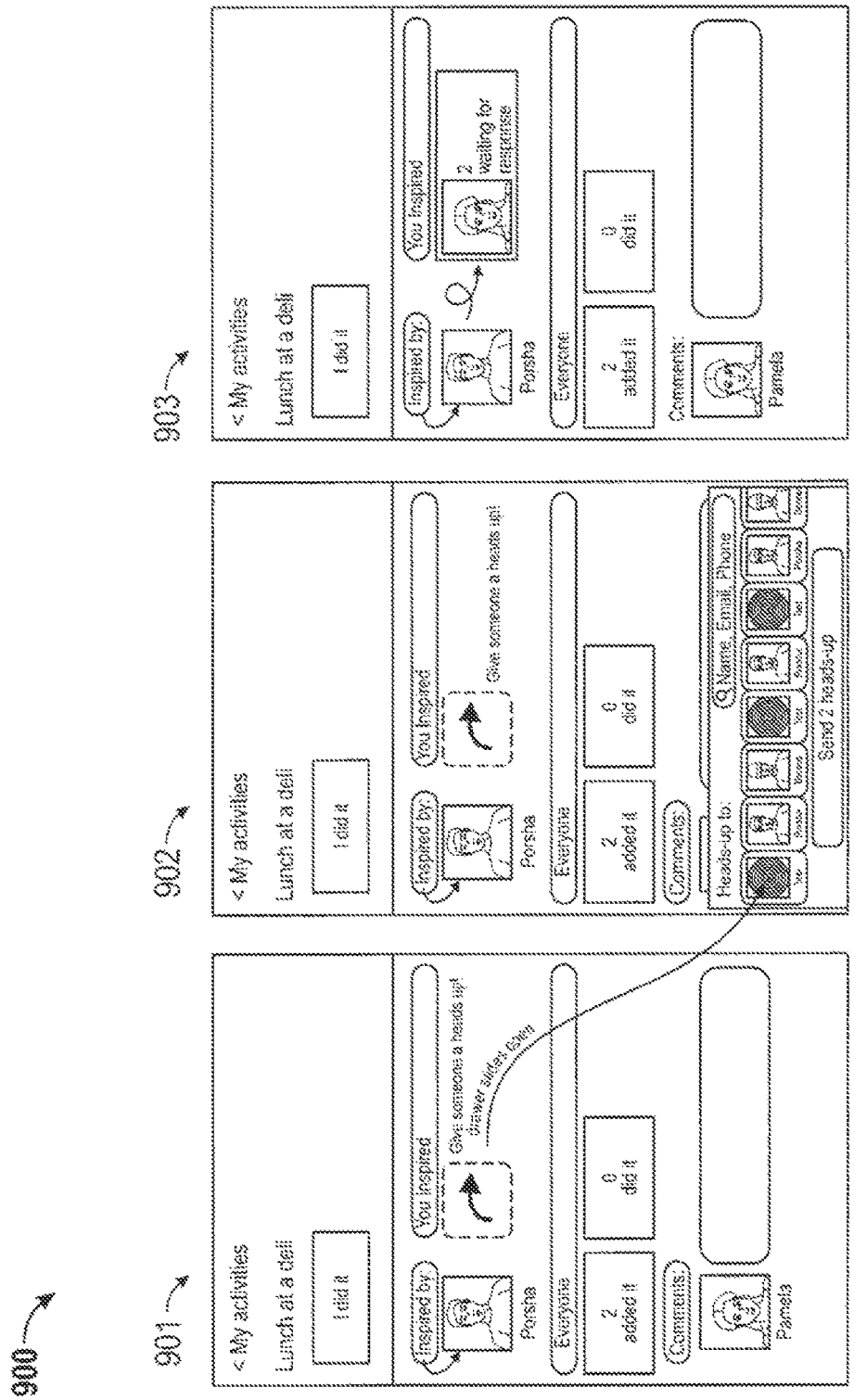
FIG. 9 depicts the addition of additional users to a specific activity, where the user adding additional users was "inspired" by a first user.

In some embodiments, a user may add additional users to a specific activity using the activity assistant user interface, as shown in FIG. 9, wherein the user adding additional users was "inspired" by a first user. If a specific user thinks additional users may be interested in an activity, he can "inspire" the additional users to add the specific activity to their list of activities. Thus, one activity can be propagated to multiple users.

Figure 10:
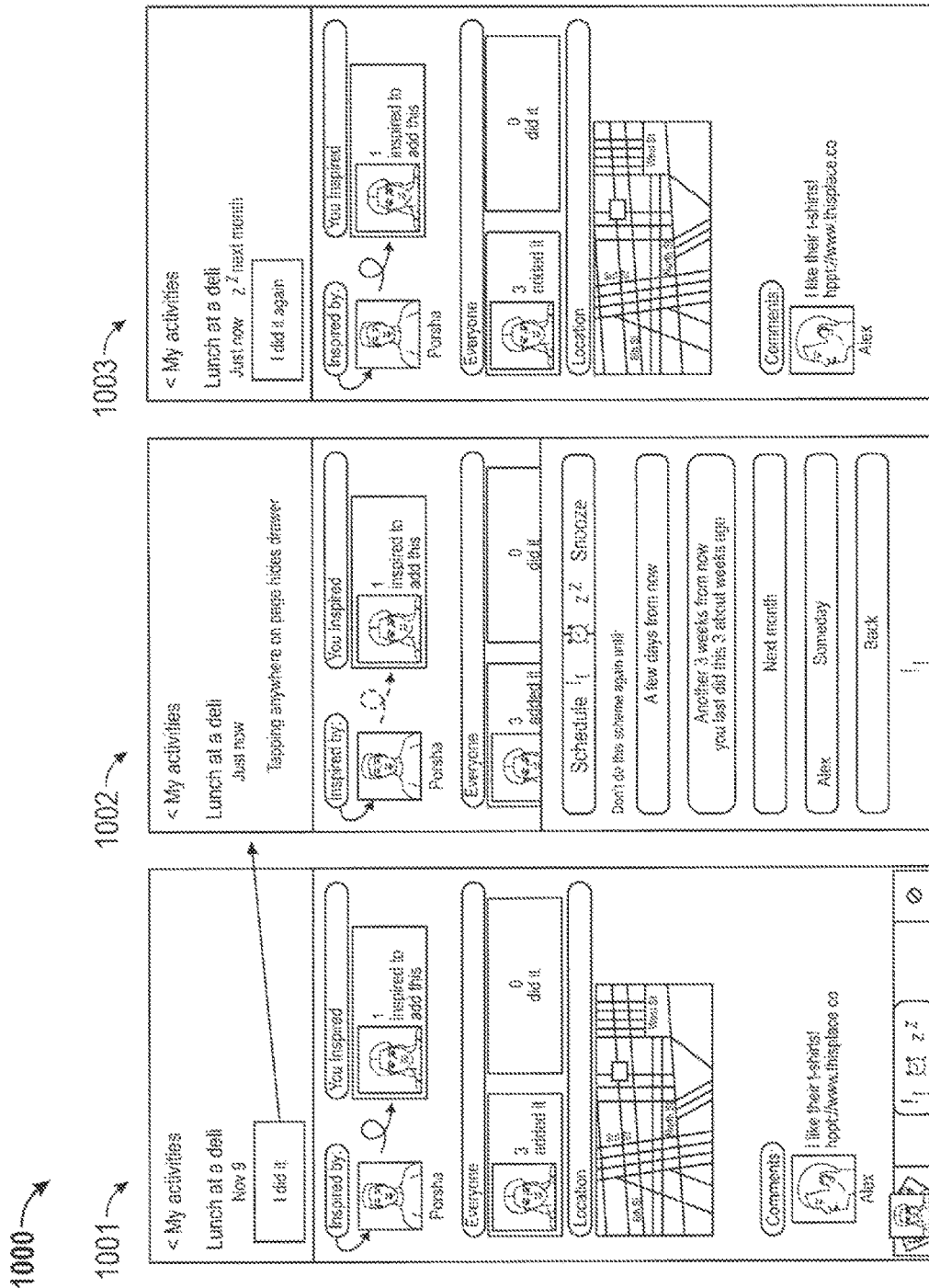
FIG. 10 depicts an example activity-assistant user interface for an activity that has been marked "done."

In some embodiments, a user may use the activity-assistant user interface for an activity that has been marked "done", as shown in FIG. 10. Upon marking something "done," the activity assistant may prompt a user for the timeframe in which the activity may be repeated. For example, a user may cut his hair once a month. The activity assistant may generate a signal relating to the time the activity should appear on a users activity list.

Figure 11:
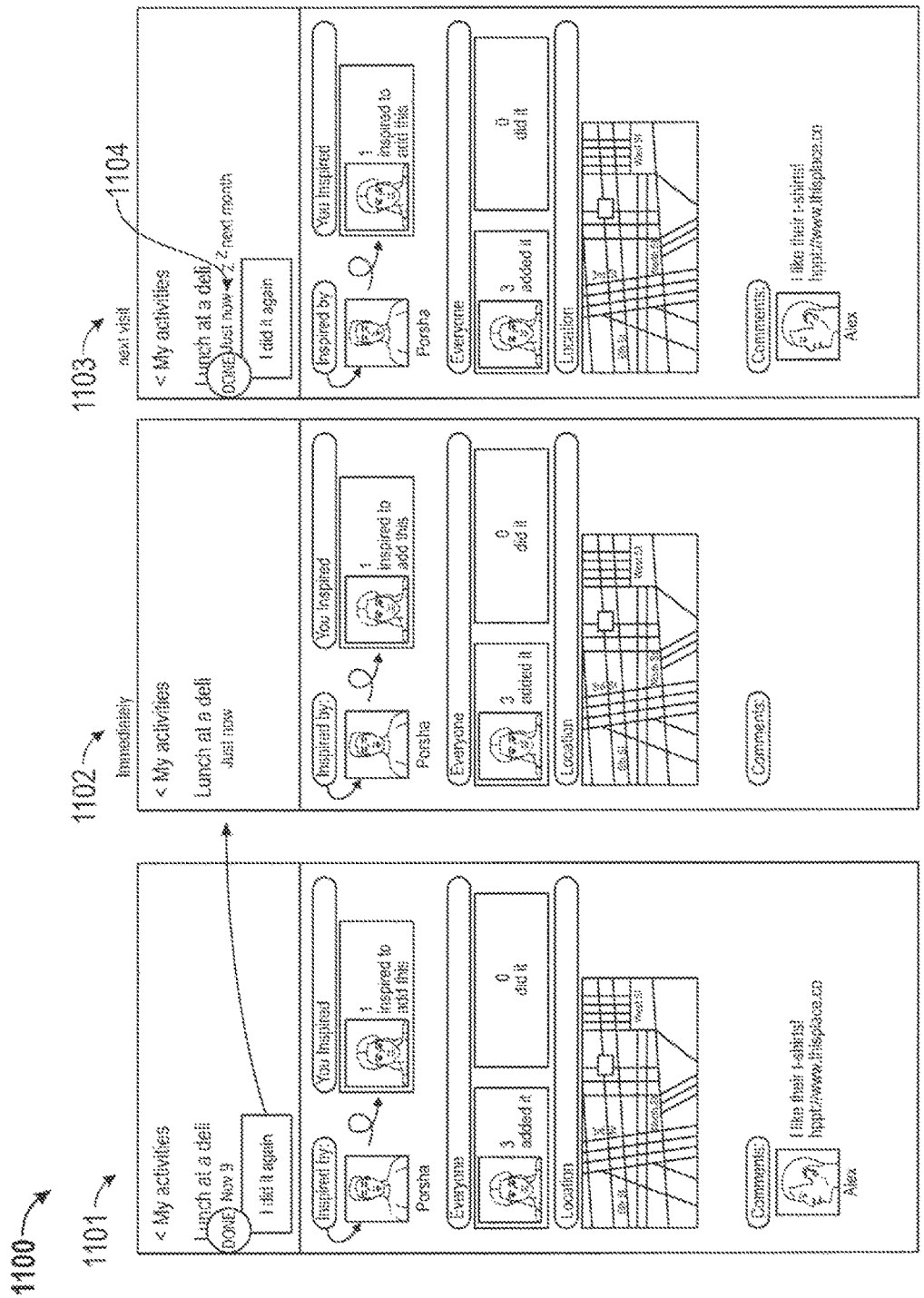
FIG. 11 depicts an example activity-assistant user interface for an activity that has been marked "done."

In some embodiments, a user may use the activity-assistant user interface for an activity that has been marked "done", as shown in FIG. 11. Upon marking something "done" in display 1101, the activity assistant in display 1102 may permit a user to recommend an activity and provide a "heads-up" to another user, schedule a repetition of the activity, or mark that this activity should not be performed again. Display 1103 shows a subsequent view of the activity with a "Done" indication 1104.

Figure 12:
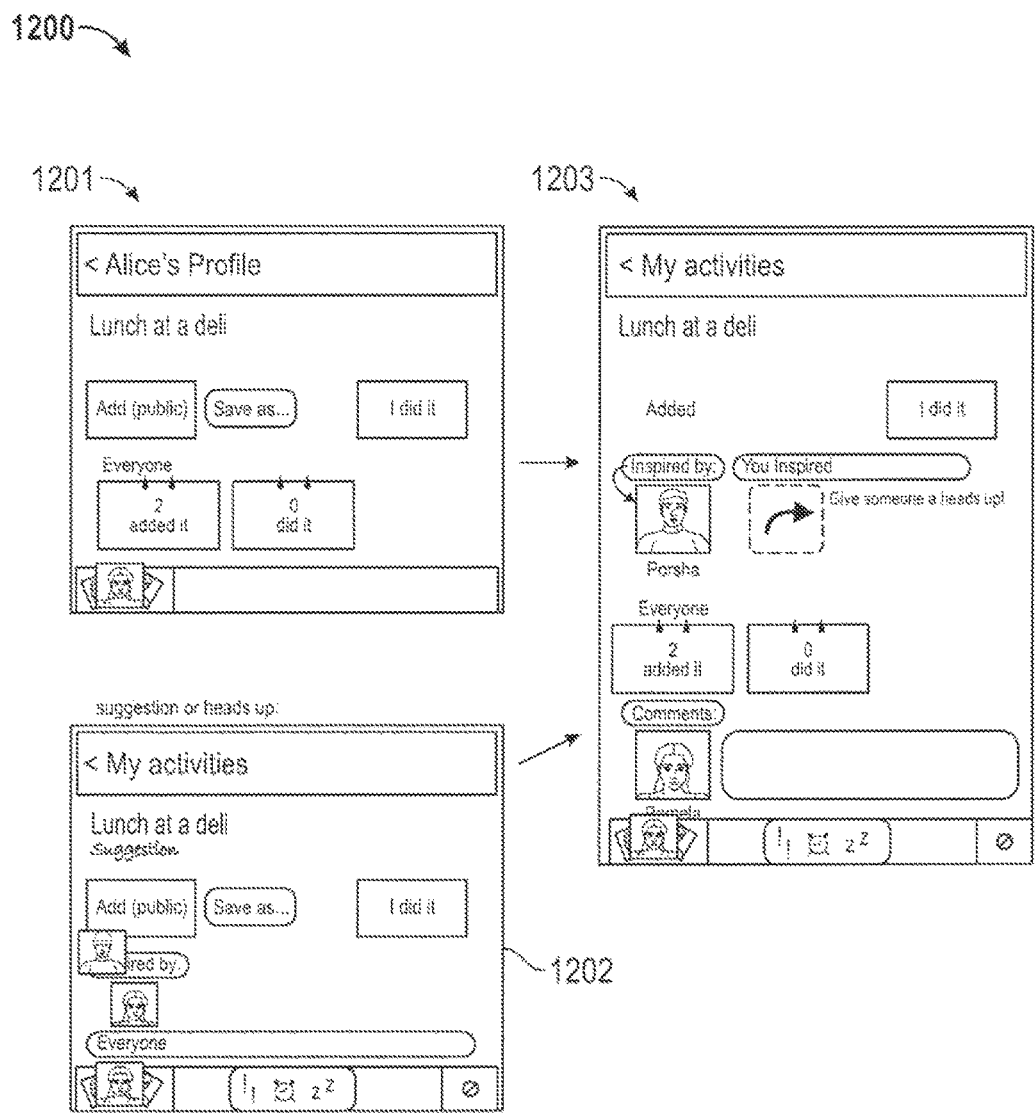
FIG. 12 depicts an activity viewed by a current user, perhaps that a first user has suggested to the current user or perhaps otherwise found by the current user (e.g., via search or self-generation).

FIG. 12 depicts an embodiment where an activity is viewed by a current user "Alice" in her profile, as shown in display 1201. The activity was perhaps suggested to Alice by a first user "Andrea" as shown in display 1202, or perhaps otherwise found by Alice (e.g., via search or self-generation). The current user Alice may have the option to add the activity to their list of activities and/or mark the activity as "done." If the current user Alice acts in response to a suggestion from the first user Andrea, the activity assistant may indicate that the first user Andrea "inspired" the current user to perform the activity, as shown in display 1203 of FIG. 12.

Figure 13:
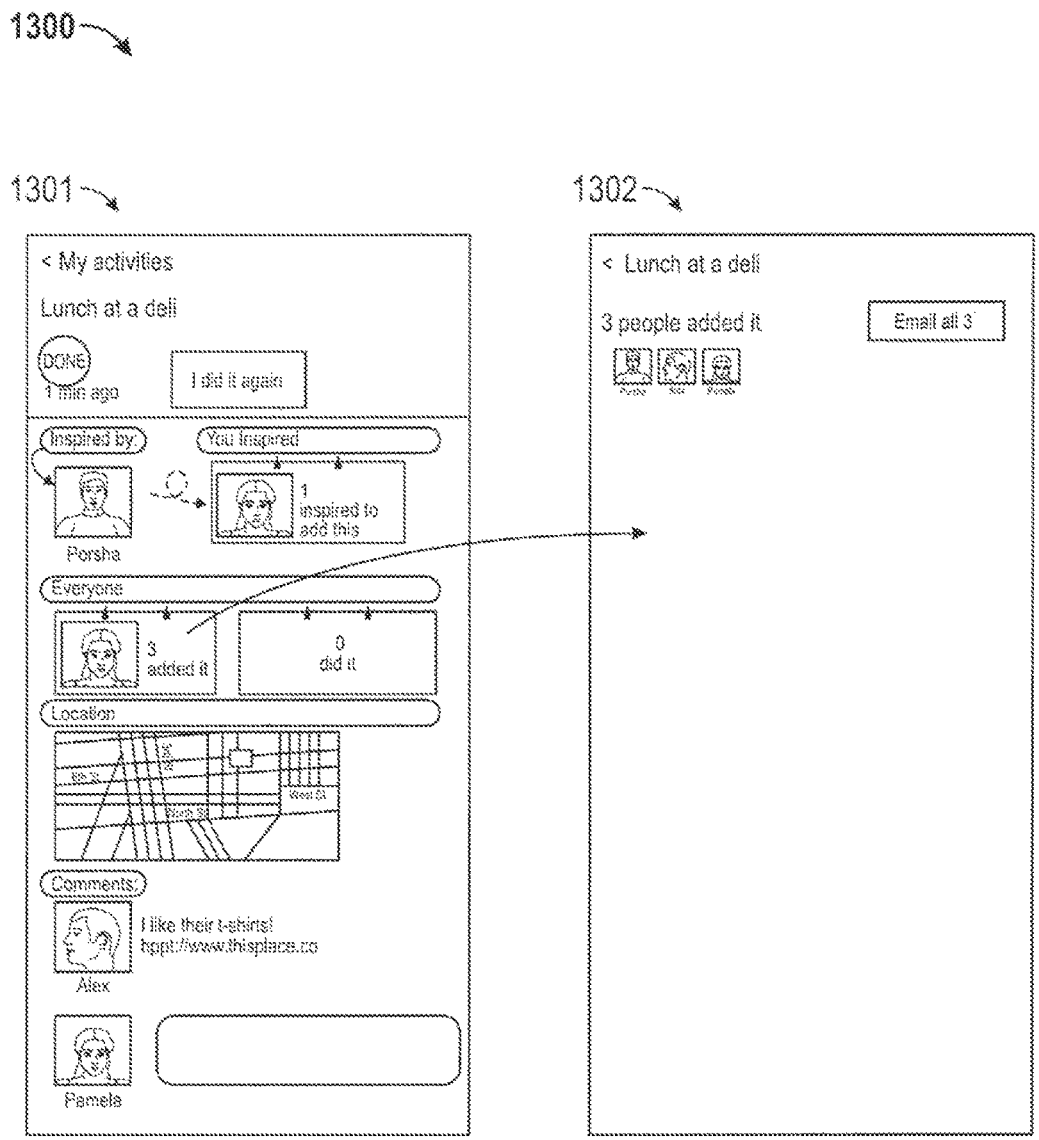
FIG. 13 depicts an activity that many users have added.

In some embodiments, the activity assistant user interface may display an activity that many users have added, as shown in FIG. 13. A user may be interested in other users who have added the activity. The activity-assistant user interface includes a link to the profiles of other users who have added the same event.

Figure 14:
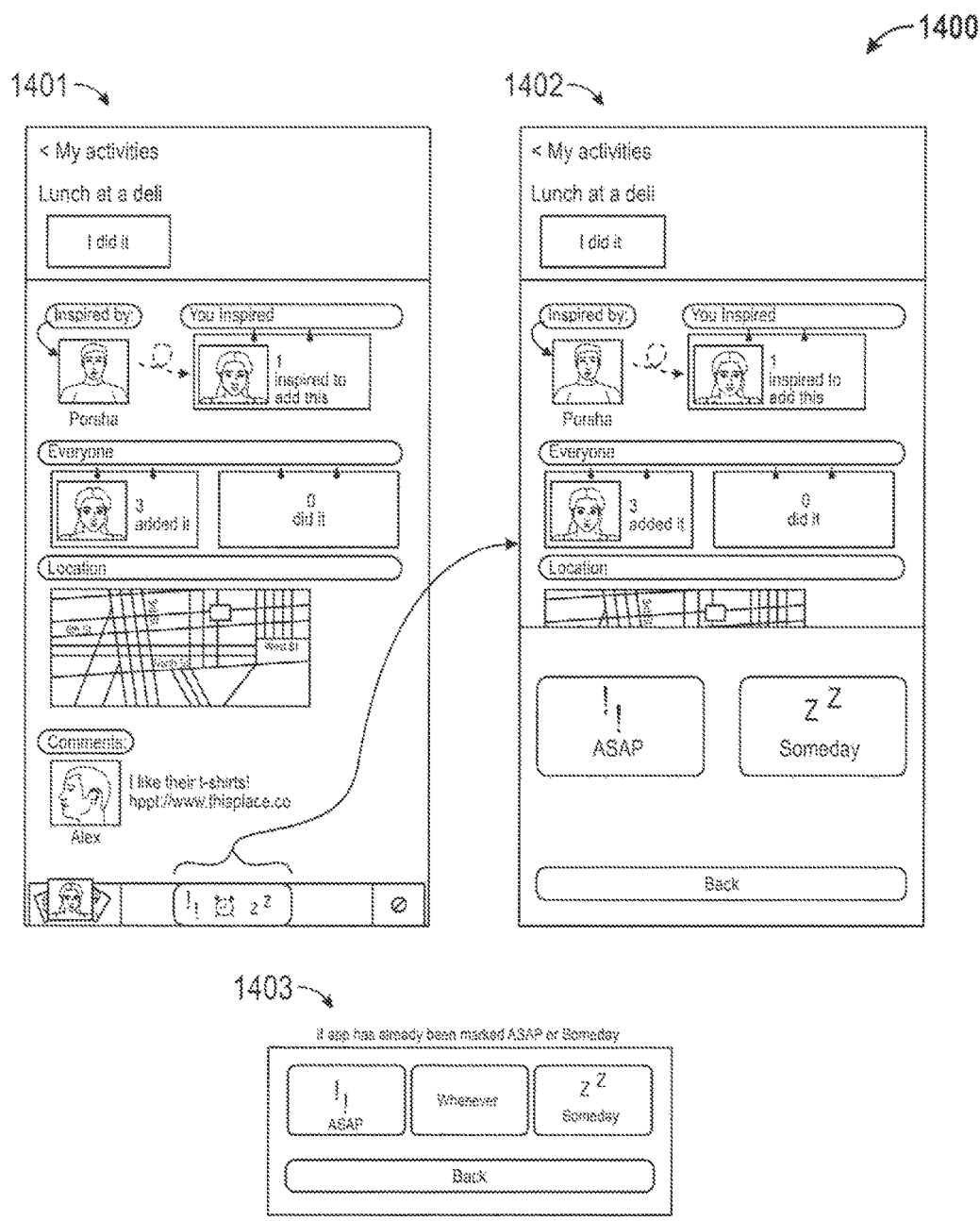
FIG. 14 depicts a user changing the priority of an activity by either delaying the activity or marking is ASAP.

In some embodiments, a user may change the priority of an activity by either delaying the activity or marking is ASAP using the activity assistant user interface, as shown in FIG. 14. When an activity is delayed, a signal is sent to the activity assistant to return the activity to the activity list at a later date. For example, if a user doesn't feel like a specific restaurant he may "snooze," delay, the visit to the restaurant and the activity assistant may suggest the restaurant at a later date. On the other hand, a user may have an important job interview and want a haircut promptly, thus he may select ASAP and a corresponding signal will be generated telling the activity assistant to increase the priority of a haircut.

Figure 15:
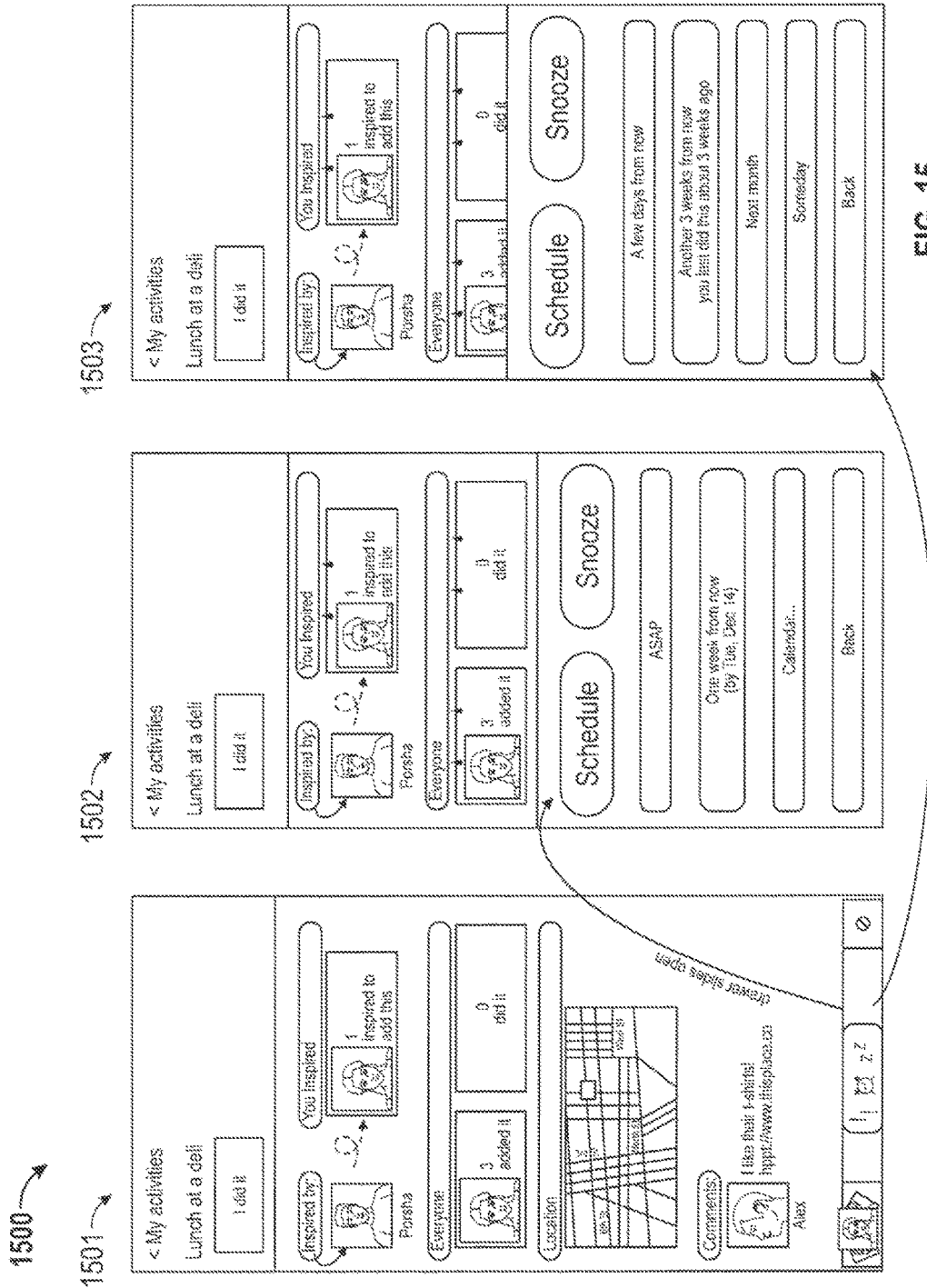
FIG. 15 depicts a further embodiment of a user changing the priority of an activity by either delaying the activity or reminding the user to complete the activity.

In some embodiments, a user may change the priority of an activity by either delaying the activity or reminding the user to complete the activity using the activity assistant user interface, as shown in FIG. 15. When an activity is delayed, a signal is sent to the activity assistant to return the activity to the activity list at a later date. For example, if a user doesn't feel like a specific restaurant he may "snooze," delay, the visit to the restaurant and the activity assistant may suggest the restaurant at a later date. The user may choose from a range of time frames, based on how long he is willing to delay the activity. On the other hand, a user may have an important job interview and want a haircut promptly, thus he may want to be reminded ASAP. A signal will be generated telling the activity assistant to increase the priority of a haircut based on the user's specified time frame.

Figure 16:
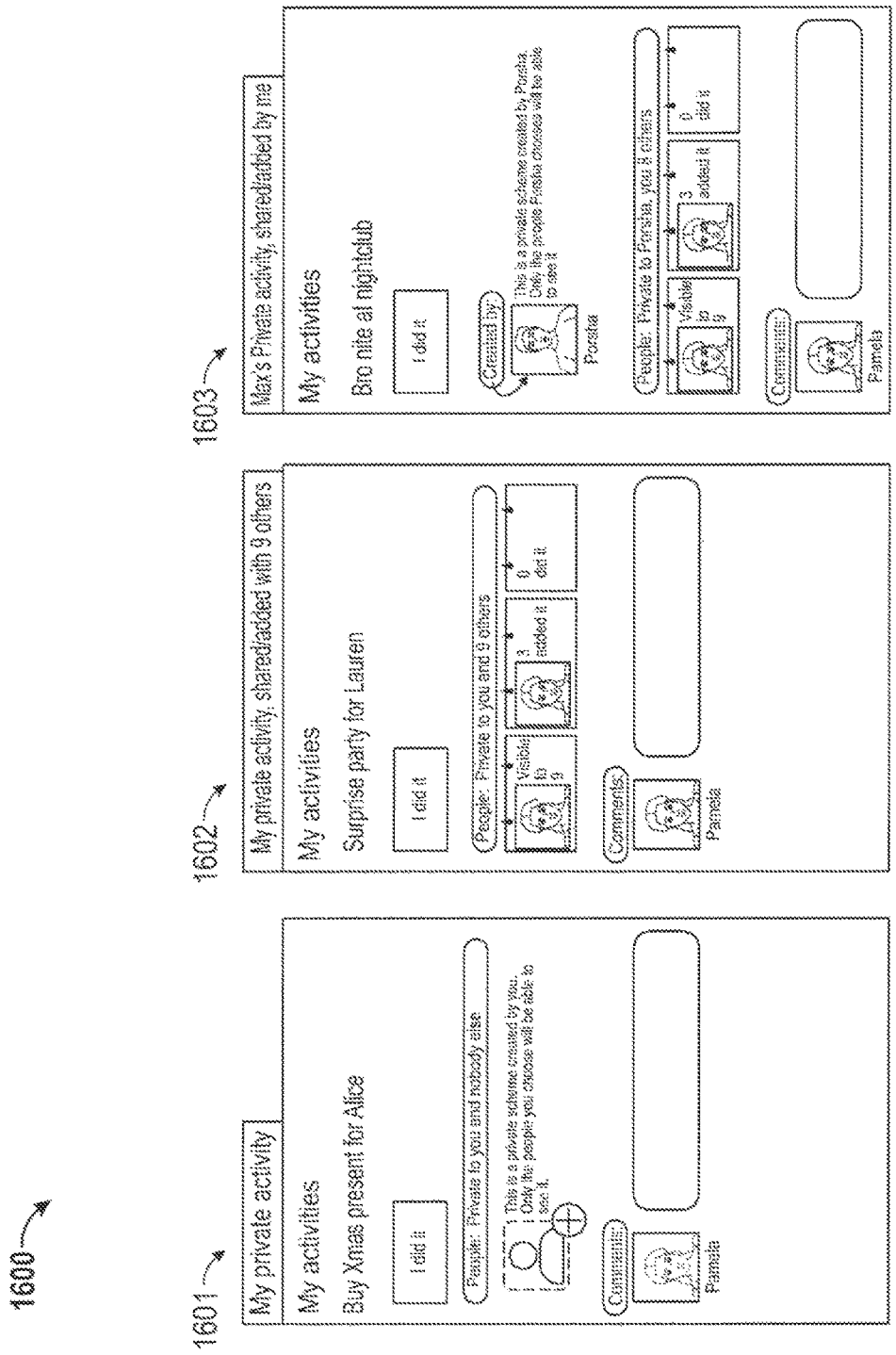
FIG. 16 depicts "private" activities.

In some embodiments, the activity assistant user interface may display a "private" activity as shown in FIG. 16. A user may want to create an activity and limit the number of people who can see the activity. In one embodiment, a user may want the activity only visible to him, thus nobody else will be able to see or locate the activity, as shown in display 1601 of FIG. 16. On the other hand, a user may want to keep and activity private, but have an exclusive list of who can add the activity and see the details, such as shown in display 1602 of FIG. 16. For example, if a user is throwing a surprise party, he may add all guests of the party, but exclude the person for whom the party is being thrown. Thus, the activity will not be seen by that specific user who was excluded, but the activity will appear for the other invitees. Display 1603 of FIG. 16 shows an example view of the activity for one of the other invitees, Max.

Figure 17:
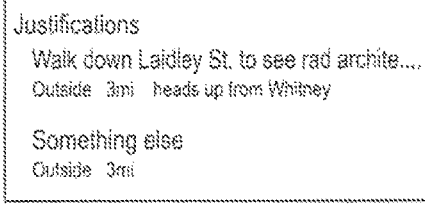
FIG. 17 depicts menus generated by the activity-assistant user interface for a suggested activity.
Figure 17:
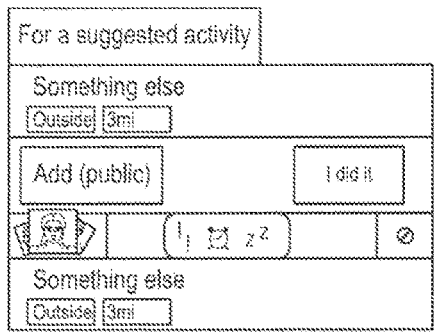
Figure 17:
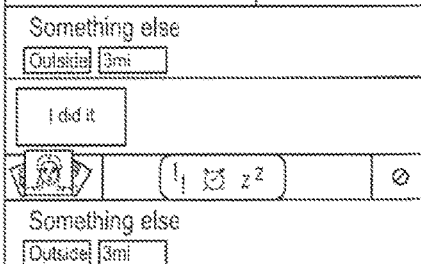

In some embodiments, the activity assistant user interface may display menus generated by the activity-assistant user interface for a suggested activity, as shown in FIG. 17. Display 1701 displays one or more "justifications" for a suggested activity. When an activity is suggested, a user may want to add the activity to his list or mark the activity "done" as shown in display 1702. Additionally, he may also want to mark the activity as "not interested" as shown in display 1702 so the activity assistant doesn't suggest the activity in the future. After adding the suggested activity, the user can mark the activity as "done" as shown in display 1703.

Figure 18:
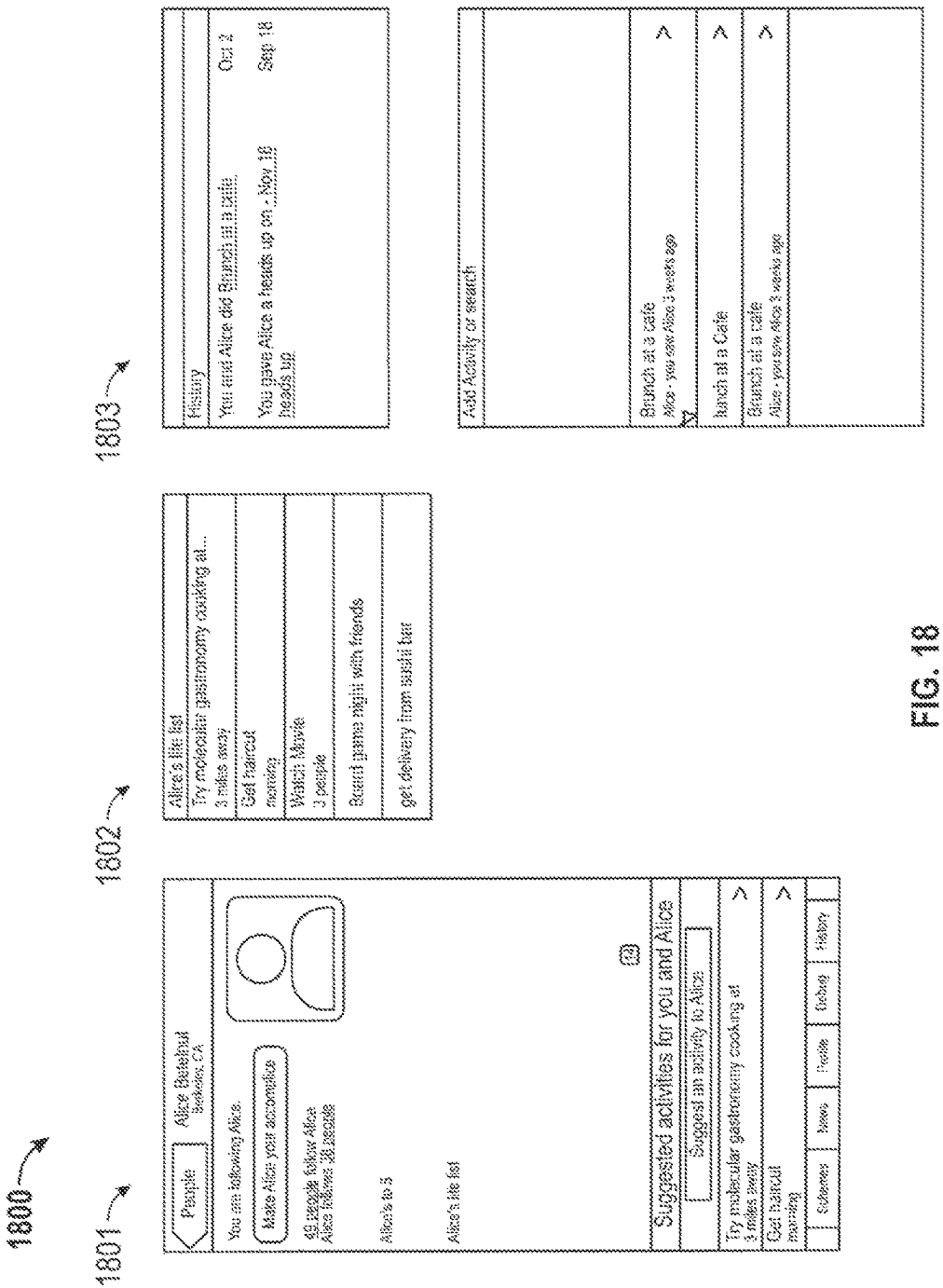
FIG. 18 depicts a user's profile within the activity-assistant user interface.

In some embodiments, the activity assistant user interface may display a user's profile within the activity-assistant user interface, as shown in FIG. 18. In display 1801, an example profile is shown including a user's "following" users (e.g., users that have a relationship or an association with the user), the user's top activities, current activity list, future activities, and historical activities. One or more users may be interested in what activities other users participate. By "following" a specific user, a following user can see what public activities the specific user adds and does and see what activities are suggested to the specific user. This may allow the following user to add some activities to his/her own activity list. Further, the following user can contact the specific user and send messages, such as heads-up for activities, to the specific user. By sending a heads-up message to the specific user, the following user can inform, remind, and/or suggest a given activity to the specific user As further shown in FIG. 18, display 1802 shows an example "life list" for a user includes one or more activities. The display 1802 is understood as an importance based display of one or more activities, in which the display 1802 includes a ranking of the activities for display based at least on information stored in a profile for a user. In some configurations, the display 1802 includes a ranking of the activities for display based on the user's profile similar to the context menu and activity list described above in FIG. 3 or as described in FIG. 21 below. Additionally, FIG. 18 includes display 1803 that shows a history of activities for the user.

Figure 19:
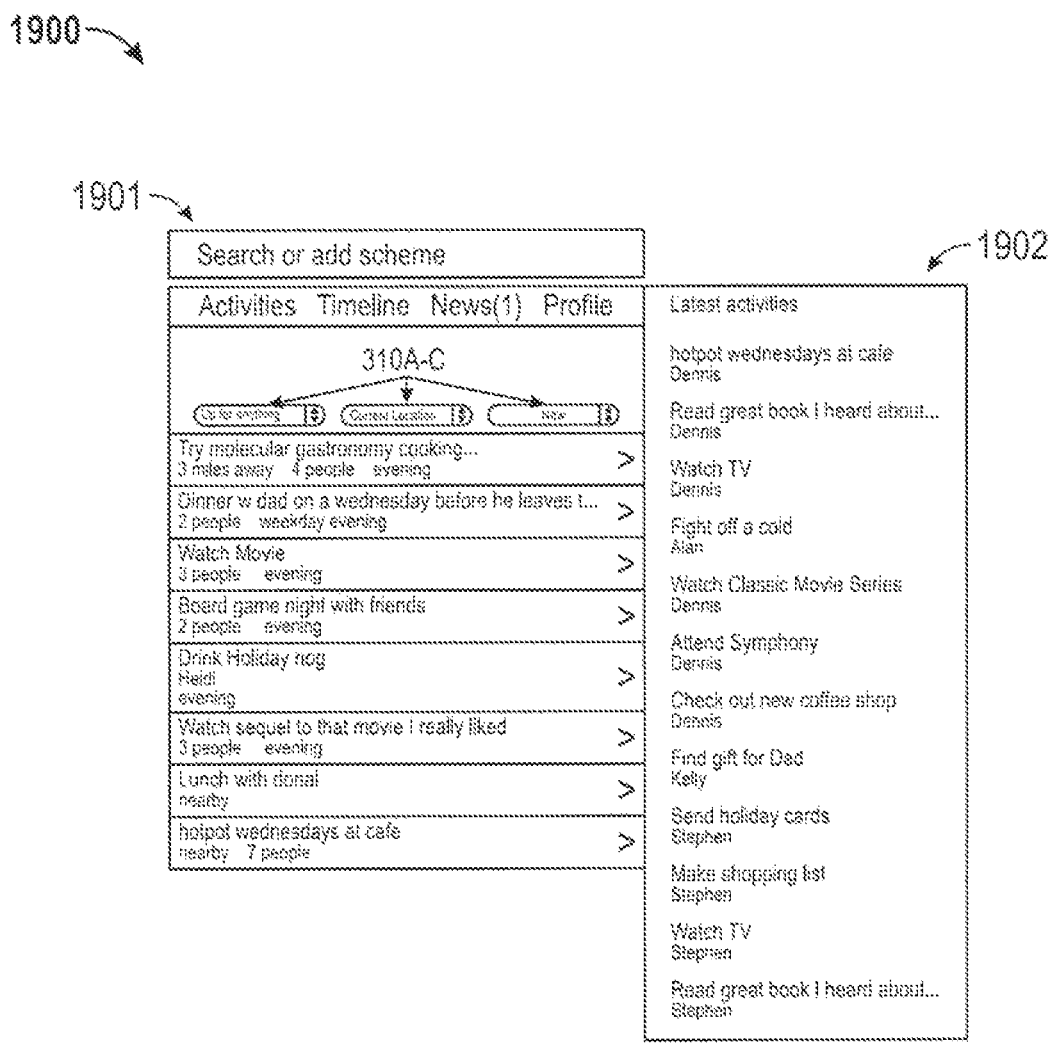
FIG. 19 depicts an example activity-assistant user interface.

In some embodiments, the activity assistant user interface may be viewed by a user, as shown in FIG. 19. The suggested activity list shown in display 1901 is created by the activity assistant, based on the user-specific parameters a user has entered. When a user changes a user-specific parameter, a signal is generated and the activity assistant may modify the activity list accordingly. Additionally, the activity-assistant user interface may include additional activities not on a user's activity list as shown in display 1902, but that the user may be interested in adding.

Figure 20:
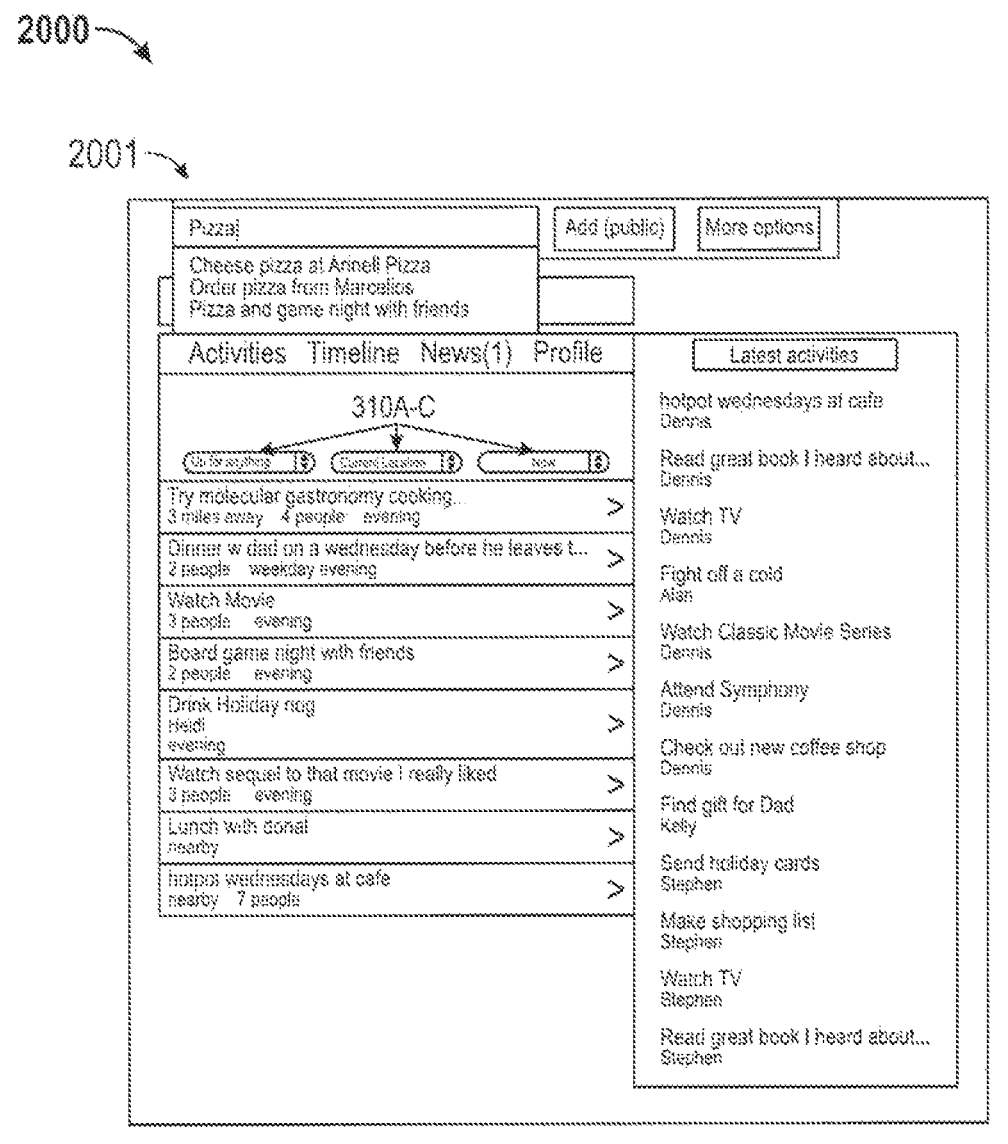

In some embodiments, a user may use the activity assistant user interface 2000 to enter an activity and the activity assistant user interface may return a list of known activities relating to the users query, as shown in FIG. 20. For example, if a user wants pizza as shown in display 2001, the activity assistant user interface may return a list of activities that involve pizza; for example, ordering pizza delivery or visiting a pizza restaurant.

Figure 21:
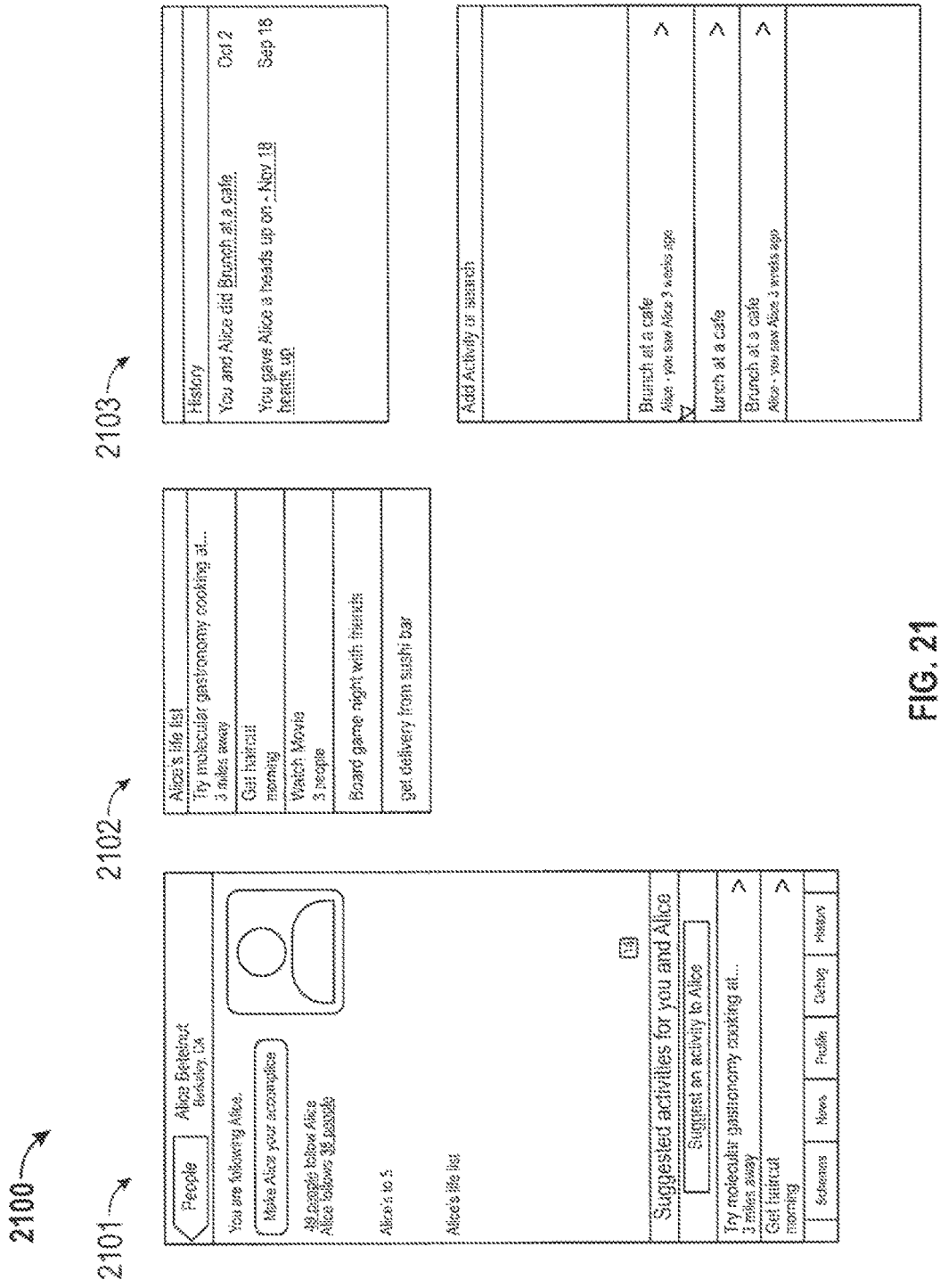
FIG. 21 depicts an example user interface of a user profile for a user with a self-curated list of activities that tell users about the user.

FIG. 21 depicts an example embodiment of a user interface 2100 for a user profile 2101 for a user with a self-curated list of activities 2102. The self-curated list 2102 can inform other users about the user, such as the user's current list of top 5 activities or a "life list" with activities that may be goals, dreams, and/or aspirations for the user (e.g., see the pyramids, take Dad to baseball game, etc.) In some configurations, the user interface 2100 is configured to generate an importance based display (e.g., a self-curated list) of the one or more activities in which a ranking is based at least in part on information stored in a profile for a user. In one example, the profile for the user includes at least a mood parameter, a location parameter, and a time-related parameter. If a viewing user reviews the user's profile, suggested activities for both the viewing user and the user can be shown, such as indicated in display 2103. In some cases, these activities are activities both users have indicated they want to complete. Display 2103 also shows a shared history of activities that both users have completed to remind and, perhaps quickly add new activities for both users.

Figure 22:
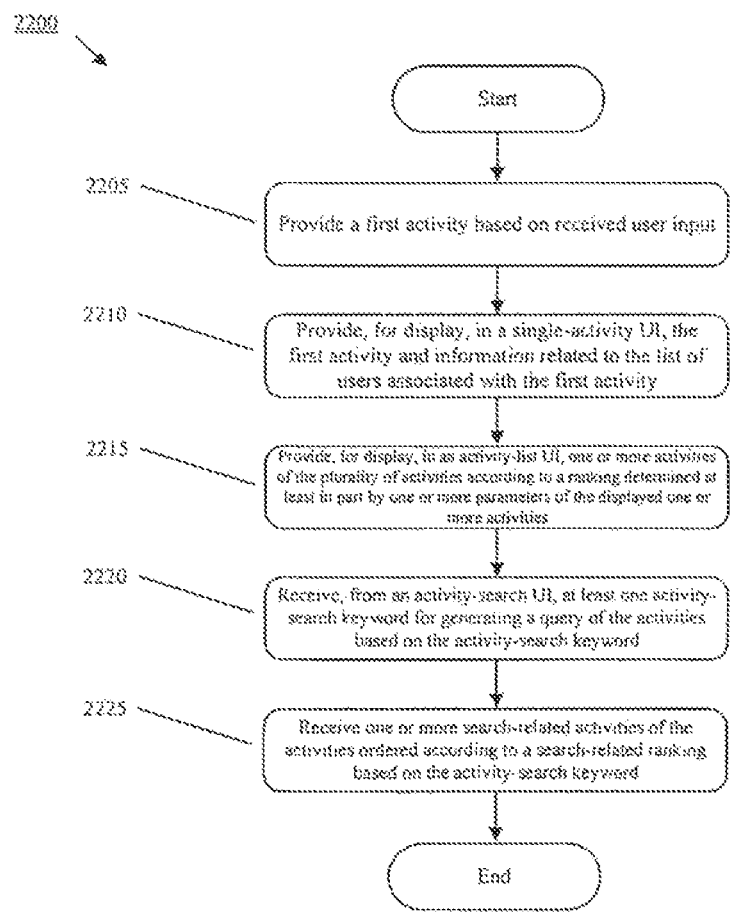
FIG. 22 conceptually illustrates an example process for performing different operations in connection with the aforementioned user interfaces.

FIG. 22 conceptually illustrates an example process 2200 for performing different operations in connection with the aforementioned user interfaces. The process 2200 begins at 2205 by providing a first activity based on received user input (e.g., as shown in FIG. 4). The first activity is included in several activities stored in a global activity database (e.g., global activity database 112 in FIG. 1) and each activity of the several activities includes several parameters. For instance, the parameters include a status parameter and a list of associated users.

The process 2200 at 2210 provides, for display, in a single-activity UI (e.g., as shown in FIG. 7), the first activity and information related to the list of users associated with the first activity. The information related to the list of users includes information for the first activity and information for each user on the list of users in which the information for each user includes a user identifier (e.g., a name of the user).

The process 2200 at 2215 provides, for display, in an activity-list UI (e.g., as shown in FIGS. 3, 6 and 19), one or more activities of the several activities according to a ranking determined at least in part by one or more parameters of the displayed one or more activities.

The process 2200 at 2220 receives, from an activity-search UI (as shown in FIGS. 3, 4, 5 and 20), at least one activity-search keyword for generating a query of the activities based on the activity-search keyword. The process 2200 at 2225 receives one or more search-related activities of the activities ordered according to a search-related ranking based on the activity-search keyword in which the activity-list UI displays the one or more search-related activities. The process 2200 then ends.

CONCLUSION

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

It should be understood that for situations in which the systems and methods discussed herein collect personal information about users, the users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   providing for display a user interface (UI) associated with a first activity on an activity list associated with a first user's account;
   detecting a first interaction with a UI element in the UI;
   responsive to detecting the first interaction, providing for display one or more selectable elements each corresponding to a respective user account comprising an activity list to which the first activity has been added to a user account activity list associated with the activity;
   detecting a second interaction with one of the selectable elements corresponding to a second user's account;
   responsive to detecting the second interaction, providing for display a profile of the second user in an assistant UI of the first user, the profile comprising an indication of an association between the first user's account and the second user's account and a first listing of activities suggested for the second user's account;
   detecting a third interaction with a first UI element in the first user's assistant UI; and
   responsive to detecting the third interaction, providing for display an ordered-list UI comprising a second listing of activities, now including the first activity, associated with the second user's account,
   wherein an order of the second listing of activities reflects, at least in part, information stored in the second user's account.

2. The method of claim 1, further comprising providing for display in the assistant UI an indication of a number of user accounts that follow the second user's account and an indication of a number of user accounts followed by the second user's account.

3. The method of claim 1, wherein the second listing of activities comprises at least one user-added activity associated with the second user's account.

4. The method of claim 1, wherein the second listing of activities comprises at least one activity designated by the second user's account to be viewable via the first user's account.

5. The method of claim 1, wherein the UI element in the UI comprises an indication of a number of user accounts with the first activity added to a respective activity list associated each respective user account among the number of user accounts.

6. The method of claim 1, further comprising:
   providing for display the activity list associated with the first user's account in an activity-list UI of the first user, the activity list associated with the first user's account comprising a plurality of UI elements, each of the plurality of UI elements corresponding to one of a plurality of activities, the plurality of activities comprising the first activity; and
   detecting a fourth interaction with one of the plurality of UI elements that corresponds to the first activity,
   wherein providing for display the UI is in response to detecting the fourth interaction.

7. The method of claim 1, wherein at least one activity of the first listing of activities is also suggested for the first user's account.

8. The method of claim 1, further comprising providing for display a third listing of activities, the third listing of activities comprising a shared history of one or more activities designated as having been completed by both the first user and the second user.

9. The method of claim 1, further comprising:
   providing for display a second UI element in the assistant UI;
   detecting a second interaction with the second UI element; and
   facilitate sending of a message about an activity to the second user's account.

10. The method of claim 1, wherein the information stored in the second user's account comprises at least one of a mood parameter, a location parameter, or a time-related parameter.

11. A system comprising:
    one or more processors; and
    a non-transitory computer-readable medium comprising instructions stored therein, which, when executed by the one or more processors, cause the one or more processors to perform operations comprising:
       providing for display a user interface (UI) associated with a first activity on an activity list associated with a first user's account;
       detecting a first interaction with a UI element in the UI;

responsive to detecting the first interaction, providing for display one or more selectable elements each corresponding to a respective user account comprising an activity list to which the first activity has been added to a user account activity list associated with the activity;

detecting a second interaction with one of the selectable elements corresponding to a second user's account;

responsive to detecting the second interaction, providing for display a profile of the second user in an assistant UI of the first user, the profile comprising an indication of an association between the first user's account and the second user's account and a first listing of activities suggested for the second user's account;

detecting a third interaction with a first UI element in the first user's assistant UI; and responsive to detecting the third interaction, providing for display an ordered-list UI comprising a second listing of activities, now including the first activity, associated with the second user's account,
wherein an order of the second listing of activities reflects, at least in part, information stored in the second user's account.

12. The system of claim 11, wherein the operations further comprise providing for display in the assistant UI:
an indication of a number of user accounts that have a first association type with the second user's account;
an indication of a number of user accounts that have a second association type with the second user's account; and
an indication that the first user's account has the first association type with the second user's account.

13. The system of claim 11, wherein the operations further comprise:
providing for display an activity-list UI, the activity-list UI comprising a plurality of UI elements, each of the plurality of UI elements corresponding to one of a plurality of activities associated with the first user's account; and
detecting a fourth interaction of the first user with one of the plurality of UI elements that corresponds to the first activity,
wherein providing for display the single-activity UI is in response to detecting the fourth interaction.

14. The system of claim 11, wherein the plurality of activities comprises at least one activity added to an activity list associated with the first user's account and at least one activity suggested for the first user's account.

15. A non-transitory machine-readable medium comprising instructions stored therein, which when executed by a machine, cause the machine to perform operations comprising:

providing for display a user interface (UI) associated with a first activity on an activity list associated with a first user's account;

detecting a first interaction with a UI element in the UI;

responsive to detecting the first interaction, providing for display one or more selectable elements each corresponding to a respective user account comprising an activity list to which the first activity has been added to a user account activity list associated with the activity;

detecting a second interaction with one of the selectable elements corresponding to a second user's account;

responsive to detecting the second interaction, providing for display a profile of the second user in an assistant UI of the first user, the profile comprising an indication of a number of user account that have a first association type with second user's account and a first listing of activities suggested for the second user's account;

detecting a third interaction with a first UI element in the assistant UI; and responsive to detecting the third interaction, providing for display an ordered-list UI-comprising a second listing of activities, now including the first activity, associated with the second user's account,
wherein an order of the second listing of activities reflects, at least in part, information stored in the second user's account.

16. The non-transitory machine-readable medium of claim 15, wherein the assistant UI further comprises an indication that the first user's account has the first association type with the second user's account.

17. The non-transitory machine-readable medium of claim 15, wherein the assistant UI further comprises an indication of a number of users that have a second association type with the second user's account.

18. The non-transitory machine-readable medium of claim 15, wherein the operations further comprise providing for display one or more activities suggested for both the first user's account and the second user's account.

* * * * *